(12) United States Patent
Shimizu

(10) Patent No.: US 8,094,169 B2
(45) Date of Patent: Jan. 10, 2012

(54) IMAGING MODEL AND APPARATUS

(75) Inventor: Sota Shimizu, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 964 days.

(21) Appl. No.: 11/960,607

(22) Filed: Dec. 19, 2007

(65) Prior Publication Data

US 2008/0158226 A1 Jul. 3, 2008

Related U.S. Application Data

(60) Provisional application No. 60/875,649, filed on Dec. 19, 2006.

(51) Int. Cl.
*G09G 5/00* (2006.01)
*G06K 9/32* (2006.01)

(52) U.S. Cl. .......................................... 345/647; 382/297

(58) Field of Classification Search ...................... None
See application file for complete search history.

(56) References Cited

U.S. PATENT DOCUMENTS

| | | | |
|---|---|---|---|
| 6,466,262 B1 | 10/2002 | Miyatake et al. | |
| 6,535,617 B1 | 3/2003 | Hannigan et al. | |
| 6,611,282 B1 * | 8/2003 | Trubko et al. | 348/36 |
| 6,836,298 B2 | 12/2004 | Song et al. | |
| 7,058,237 B2 | 6/2006 | Liu et al. | |
| 2002/0064314 A1 | 5/2002 | Comaniciu et al. | |
| 2003/0098954 A1 | 5/2003 | Amir et al. | |
| 2005/0036707 A1 | 2/2005 | Matsuura | |
| 2005/0083482 A1 | 4/2005 | Miller et al. | |
| 2005/0089213 A1 | 4/2005 | Geng | |
| 2007/0006317 A1 | 1/2007 | Asami et al. | |
| 2008/0143857 A1 | 6/2008 | Shimizu et al. | |

FOREIGN PATENT DOCUMENTS

| | | |
|---|---|---|
| JP | 10 188 146 | 7/1998 |
| KR | 2003 0078235 | 10/2003 |
| KR | 20060059302 | 9/2007 |
| WO | 97/43854 | 11/1997 |
| WO | 02/078346 | 10/2002 |
| WO | 03/107274 | 12/2003 |
| WO | 2006/062325 | 6/2006 |

OTHER PUBLICATIONS

PCT Search Report for PCT/US2007/088233 filed on Dec. 19, 2007 in the name of California Institute of Technology.
PCT Written Opinion for PCT/US2007/088233 filed on Dec. 19, 2007 in the name of California Institute of Technology.
PCT Search Report for PCT/US2007/088228 filed on Dec. 19, 2007 in the name of California Institute of Technology.

(Continued)

*Primary Examiner* — Kee M Tung
*Assistant Examiner* — Carlos Perromat
(74) *Attorney, Agent, or Firm* — Steinfl & Bruno, LLP

(57) ABSTRACT

A system and method for making an imaging model and an imaging apparatus. An apparatus for image processing may include an optical element having a field of view, and image sectoring element coupled to the optical element, the image sectoring element configured to sector the field of view in a plurality of areas, and an image processor coupled to the image sectoring element, the image processor configured to process an image in accordance with the plurality of areas. Methods to make the foregoing apparatus are also described.

26 Claims, 43 Drawing Sheets

OTHER PUBLICATIONS

PCT Written Opinion for PCT/US2007/088228 filed on Dec. 19, 2007 in the name of California Institute of Technology.

T. Baron et al, Exploring With a Foveated Robot Eye System, Proc. of 12th International Conference on Pattern Recognition, pp. 377-380, 1994.

A. Baumberg, Reliable Feature Matching Across Widely Separated Views, Proceedings of Computer Vision and Pattern Recognition, vol. 1, pp. 774-781, 2000.

F. Berton et al, Anthropomorphic Visual Sensors, Edited by C.A. Grimes, E.C. Dickey, and M.V. Pishko, vol. 10, pp. 1-16, 2005.

M. Bolduc et al, A Review of Biologically-Motivated Space-Variant Data Reduction Models for Robotic Vision, Computer Vision and Image Understanding, vol. 69, No. 2, pp. 170-184, 1996.

David Casasent et al, Position, Rotation and Scale Invariant Optical Correlation, Applied Optics, vol. 15, No. 7, Jul. 1976.

E.L. Schwatz, Spatial Mapping in the Primate Sensory Projection: Analytic Structure and Relevance to Perception, Biol. Cybernetics 25, 181-194, 1977.

Hiroshi Ishiguro et al, Omni-Directional Stereo for Making Global Map, Proc. IEEE 3rd Int. Conf. Computer Vision, 1990.

Yasuo Kuniyoshi et al, A Foveated Wide Angle Lens for Active Vision, Proc. IEEE Intl. Conf. on Robotics and Automation, pp. 2982-2988, May 1995.

Sohta Shimizu et al, Wide-Angle Vision Sensor With High-Distortion Lens, JSME International Journal, Series C, vol. 41, No. 4, 1998.

Sota Shimizu et al, Image Extraction by Wide Angle Foveated Lens for Overt-Attention, Proc. IEEE Intl. Conf. on Robotics and Automation, pp. 3437-3442, May 2006.

Sohta Shimizu et al, Wide Angle Sensor With Fovea (Navigation of Mobile Robot Based on Cooperation between Central Vision and Peripheral Vision), Proc. of BRES99, pp. 53-56, 1999.

Robert Wodnicki et al, A Foveated Image Sensor in Standard CMOS Technology, In Custom Intergrated Circuits Conference, Santa Clarita, California, May 1995.

S.W. Wilson, On the Retino-Cortical Mapping, Int. J. Man-Machine Studies, vol. 18, pp. 361-389, 1983.

Yusushi Yagi et al, Real-Time Omnidirectional Image Sensor (COPIS) For Vision-Guided Navigation, IEEE Transactions on Robotics and Automation, vol. 10, No. 1, Feb. 1994.

B.S. Reddy et al, An FFT-Based Technique For Translation, Rotation, and Scale-Invariant Image Registration, IEEE Transactions on Image Processing, vol. 5, No. 8, Aug. 1996.

Sohta Shimizu, Multi-Functional Application of Wide-Angle Foveated Vision Sensor in Mobile Robot Navigation, J. of Robotics and Mechatronics, vol. 14, No. 4, 2002.

Sota Shimizu, Machine Vision System to Induct Binocular Wide-Angle Foveated Information Into Both the Human and Computers, Proc. 2005 IEEE Intl. Conf. on Robotics and Automation, Apr. 2005.

Giulio Sandini, An Anthropomorphic Retina-Like Structure for Scene Analysis, Computer Graphics and Image Processing, vol. 14, pp. 365-372, 1980.

Sota Shimizu et al, Vision Sensor With Wide Angle and High Distortion Lens, Video Proc of IEEE Intl. Conf. on Robotics and Automation, Visual Sensing 3, May 1995.

Patrick Stelmaszyk et al, Local Processing as a Cue for Deceasing 3-D Structure Computational, Proc. Roundtable Discussion on Vision-Based Vehicle Guidance '90, 1990.

J. Van der Spiegel, A Foveated Retina-Like Sensor Using CCD Technology, Analog VLSI Implementations of Neural Networks, Boston, MA 1989.

G. Kreider et al, A Retina-Like Space Variant CCD Sensor, No. 1242, pp. 133-140, 1990.

S.J. Oh et al, Guidance of a Mobile Robot Using an Omnidirectional Vision Navigation System, SPIE, vol. 852 Mobile Robots II, 1987.

Non-Final office action issued by the USPTO for U.S. Appl. No. 11/960,607, filed Dec. 19, 2007 in the name of Sota Shimizu mail date: Apr. 18, 2011.

Paneri, F., et al., Space Variant Vision for an Active Camera Mount, Proc. of SPIE 1995, 2488: 284-296.

Shimojo, S., et al., Gaze bias both reflects and influences preference, Nature Neuroscience 2003, 6: 1317-1322.

Tsuji, S., et al., Local Processing as a Cue for Decreasing 3-D Structure Computation, Proc. Roundtable Discussion on Vision-Based Vehicle Guidance 1990, 129-148.

Wolberg, G., et al., Robust Image Registration Using Log-Polar Transform, Proc. of IEEE International Conference on Image Processing 2000, 1: 493-496.

Bernardino, A., et al., Foveated active tracking with redundant 2D motion parameters, Robotics and Autonomous Systems 2002, 39: 205-221.

* cited by examiner

WAF, LP, FE, and PHC - Prior Art (a) original image with 512 x 512[pixel$^2$]

(b) WAF lens image  (c) LP lens image  (d) FE lens image (e) PHC lens image

FE, PHC, and Kuniyoshi - Prior Art

LP, K lenses - Prior Art (a) WAF Lens  (b) Pinhole Camera (a) 2 obstacles (b) 3 obstacles (a) 2 obstacles    (b) 3 obstacles (a) image height $r$ (b) M. F. in the radial direction (c) M.F. in the tangential direction AdWAF - new (a)

(f)

AdWAF (a)scale=1.0 (original image)    (b)scale=0.75

(c)scale=1.5    (e)AdWAF image (a) AdWAF image  (b) Cartesian linear-coordinate image AdWAF Image Plot (a)

(f)

(a) actual image by WAF lens (b) the whole view of AdWAF image (c) para-fovea image (d) fovea image (a) number, $N$, of the RF's along the ring versus the $\theta$ (b) Sandini's Pseudo-Triangular model when $N_0=16$ (c) Bolduc's Circular model when $N_0=16$

AdWAF Image Plot

(a) AdWAF image    (b) LP lens image    (c) Klens image
(a) $\alpha = 0.75$    (b) $\alpha = 1.0$    (c) $\alpha = 1.5$
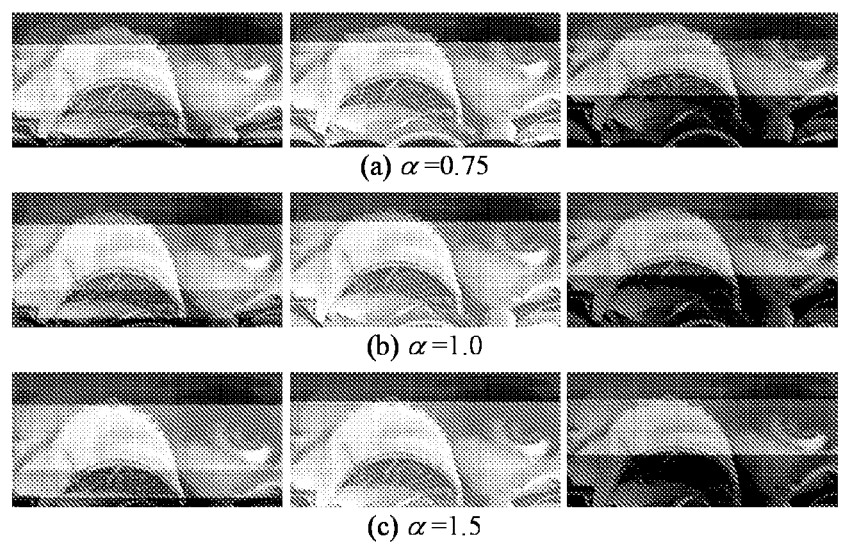
(a) $\alpha = 0.75$
(b) $\alpha = 1.0$
(c) $\alpha = 1.5$
FIG. 35(iii)

(a) a sketch of $\Delta r$ (b) $\Delta r$ versus $h$ (a) a sketch of skew coefficient $\alpha_c$ (b) RMSE versus $\cos(\alpha_c)$

IMAGING MODEL AND APPARATUS

CROSS-REFERENCE TO RELATED APPLICATIONS

This application claims priority to U.S. Provisional Application No. 60/875,649; filed Dec. 19, 2006, titled "A Model of Wide-Angle Foveation for All-purpose use."

INCORPORATION BY REFERENCE

References cited within this application, including patents, published patent applications other publications, and the U.S. Provisional Application No. 60/875,649; filed Dec. 19, 2006, are hereby incorporated by reference in their entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND

1. Field

This disclosure is generally related to an imaging model and an apparatus and in particular to a foveation-related imaging model and a system based on foveation-related imaging.

2. Description of Related Art

A typical human retina-like image sensor, that is, a fovea vision sensor, is applicable to several uses. Such a space-variant image sensor realizes facilitates observing a wider field-of-view (FOV) having a much smaller number of data, and observing the central FOV in more detail than other parts of the FOV. Log-polar (LP) mapping is used as a typical model for image representation. This mapping is inspired by analytic formulation from biological observation of the primate visual system. This mapping has been applied to computer vision computationally to produce an LP vision chip having CCD or CMOS technologies. The LP mapping is effective not only for a significant image data reduction, as the human retina does, but also suitable for generating geometrical rotation and scale-invariant feature because of mathematical property of LP mapping.

Another method to acquire the log-polar image, being an optical approach also exists. This approach usually combines the specially-made Wide Angle Foveated (WAF) lens with a commercially available conventional Cartesian vision chip, where photosensitive element is size-invariant, although the LP chip approach combines the specially-made chip with logarithmic size-variant photosensitive elements having a conventional lens. The optical approach can realize a more complicated combination of different coordinate systems more easily than the specially-made chip. The WAF lens can provide higher resolution in the central FOV because of its optical magnification factor (M.F.).

A camera's view direction control is quite essential for the fovea vision system suggesting to take account of overt-attention, that is, a type of attention when the camera is dynamically moved. Another type is covert-attention, that is, attention when the camera is statically fixed. A rotation, scale, and translation-invariant property is applicable for pattern recognition. Fourier-Mellin Transform is known as an algorithm to generate such a property. However, generally, a Cartesian image is not rotation- and scale-invariant, and an LP image is not translation-invariant, that is, translation causes geometrical deformation of projection in the LP coordinates. An overt-vision system with the fovea vision sensor can combine such two types of image for a reliable pattern recognition, because precise camera view direction control to a target, using the Cartesian image, reduces the distortion in the LP image. In addition, if the FOV is represented by a spherical projection, it is useful for the camera's view direction control.

An LP image acquired by the space-variant fovea sensors, is transformed into a system of Cartesian coordinates, generating a Cartesian image, because Fourier-Mellin Transform needs Cartesian coordinates in order to extract rotation, scale and translation-invariant features. However, this does not mean that the Cartesian image is more suitable as a representation of an original input image, because the Cartesian image remapped conversely from the space-variant input image has a higher resolution in its central FOV than that in the opposite case, i.e., from the Cartesian image to the LP image.

A WAF lens input image is shown in FIG. 1 comparing with the pinhole camera (PHC) lens. This PHC image has the same FOV, that is, the same view angle and the same number of pixels. The WAF lens has about 120 degrees wide FOV and adequate high resolution in the central FOV.

FIG. 2 illustrates plots related to WAF, LP, FE, and PHC lenses. FIG. 2(a) shows object height h vs. image height r. FIG. 2(b) shows object height h vs. magnification factor (M.F.) dr/dh. FIG. 2(c) shows object height h vs. M.F. r/h.

FIGS. 3(a-e) illustrate an original image, and images from a simulation of a WAF lens, an LP lens, an FE lens, and a PHC lens in that order.

FIG. 4 illustrates various plots for prior-art FE, PHC, and Kuniyoshi lenses. FIG. 4(a) shows object height h vs. image height r. FIG. 4(b) shows object height h vs. M.F. dr/dh. FIG. 4(c) shows object height h vs. M.F. r/h.

FIGS. 5(a-c) show exemplary test images under three scalings of 1.0, 0.75, and 1.5. FIGS. 5(d) and (f) are the LP lens image, and a Kuniyoshi lens (K lens) image simulated by the distribution of M.F. of the actual K lens. Both are extracted from FIG. 5(a) in conditions of $\theta_{max}=\pi/3$, $h_{max}=1$, $h_0=0.026$, and $h_1=0.21$.

FIG. 6 shows LP images from an LP lens (left) and a K lens (right) under scaling of 0.75, 1.0, and 1.5 when $\theta_{max}=\pi/3$, $h_{max}=1$, $h_0=0.026$, and $h_1=0.21$.

FIG. 7 shows plots of object height h vs. length on image plane for LP and K lenses illustrating an accuracy of scale-invariance by prior-art lenses such as LP lens, and K lens. A broken line, and a bold solid line show the LP lens, and the K lens, respectively.

Vision sensors such as a CCD camera can acquire more information than other sensors. Further, wide-angle is more convenient to multi-functional use of visual information to make it possible that mobile objects, e.g., automobiles and mobile robots, perform flexibly under various environments. Typical industrial applications are limited to single-functional use by a conventional narrow-angle vision sensor, e.g., an inspection system, and a medical application. Generally, there is a trade-off between a wide-angle and a high resolution. A wide-angle and a high resolution at the same time normally causes an enormous increment of the number of pixels per an image posing a serious problem for data transmitting and real-time processing.

It may be helpful to use a foveated visual information based on human visual property. A human eye has a 120 degree wide-angle visual field. The visual acuity is more near a fovea in the central area of retina and becomes lower towards a peripheral area. Methods to reconstruct a foveated image based on log-polar mapping by a computer, and to obtain it using a space variant scan CCD exist. A camera's view direction is controlled to acquire target information in detail at attention point. This system is called Wide Angle Foveated Vision Sensor (WAFVS) system.

The WAFVS system is composed of image input part, view direction control (VDC) part, and image processing part. Image input part has 2 CCD cameras with a special super wide-angle lens and image capture device. The special lens, named WAF lens (FIG. 8), plays a major role in this part. This lens is attached to a commercially available CCD camera and optically realizes a WAF image with 120 degrees wide visual field and local high resolution in its central area at the same time. Stereo vision with such input image provides 3D information with adequate accuracy, and further wider view area at the same time. FIG. 9 shows characteristics of left camera's image height $r_L$ on CCD image plane versus incident angle $\theta_L$ to WAF lens. For a comparison, image height $r_{per}^L$ of the PHC lens with the same visual field and the same amount of information are also shown. FIG. 1 shows the images by a WAF lens and a PHC. These curved lines are represented as Equ. (1) (WAF lens) and Equ. (2) (PHC lens). The inclination of each curve shows image resolution along a radial direction of the visual field. A typical WAF lens has a higher resolution in its central area and, on the other hand, has lower resolution in the peripheral area, compared to that of the PHC lens.

$$r_i = f_0^i \theta_i^3 + f_1^i \theta_i^2 + f_2^i \theta_i \text{ [pixels]} \tag{1}$$

$$r_{per}^i = r_{max}^i \frac{\tan\theta_i}{\sqrt{3}} \text{ [pixels]}, \tag{2}$$

where each $f_k^i$ (k=0, 1, 2) is a coefficient determined by camera calibration, and $r_{max}^i$ is image height of 60 degrees by Equ. (1). Subscript i means left camera or right camera.

Input image from WAF lens is suitable for multi-purpose and multi-functional use, because it has two different kinds of characteristic, i.e., wide-angle and local high resolution. White and black circles in each of FIG. 1(a) and (b) show incident angles with 10 and 30 degrees. The peripheral area of WAF image 30 to 60 degrees is about 40% of the whole visual field, compared to that of PHC lens image with about 90%. This area with less pixels facilitates peripheral vision, e.g., detecting an intruder and localization, and so on. On the other hand, the central area (0 to 10 degrees) of WAF image is about 10% compared to that of pinhole camera image with about 1%. This area has adequate high resolution for central vision, e.g., recognizing objects based on color, shape and pattern, acquiring more accurate 3D information and so on. The intermediate area (10 to 30 degrees) is for both central and peripheral visions.

Camera's view direction control (VDC) to change an attention point in view area rapidly using camera mover is effective for a WAF image. VDC part has VDC mechanism and four stepping motors. These motors realize neck pan rotation and left and right two cameras' tilt and vergence by two kinds of eye movement such as human saccade (rapidly) and pursuit (precisely).

Image processing part is composed of multiple computers having multi-task operating system (OS) under wireless and wired LAN. This part is characterized by flexible parallel image processing function based on timely task distributing (FIG. 10). This function has been investigated to carry out various image processing tasks in a parallel and cooperative manner. Several kinds of image processing with various levels are executed in parallel, in a distributed manner or in a selective manner, based on each processor's load. The main computer plays a role of a file server and has shared information among the computers and among the multiple tasks. Combination with camera's VDC extends application of the WAFVS system. Instead of mobile robot navigation, it seems to be effective for multi-functional application such as object tracking and simultaneous recognition.

A rational mobile robot navigation based on multi-functional use of WAF image exists as shown in FIG. 11(a). The navigation is based on two tasks of central and peripheral visions to utilize the WAF lens property. Central vision plays a role to plan an obstacle avoidance course from more accurate 3D information. On the other hand, peripheral vision plays a role to revise the locational information under odometry. The planned course and locational information are shared between the tasks and are updated periodically to improve quality of the navigation cooperatively. For example, the revised locational information improves the planned course, as regards a target point on the planned course, and objective moving distance and rotating angle are calculated. The calculated values are input to a computer for driving control of mobile robot. FIG. 11(b) shows a flow chart of this navigation. The period of peripheral vision is much shorter than that of central vision. This set-up is based on a model similar to human visual information processing, because peripheral vision is connected to mobile robot control more closely.

FIG. 12(a) shows the visual point coordinate system $O_i$-$X_i Y_i Z_i$ where the camera's optical axis coincides at $Y_i$ axis and the origin is the visual point of WAF lens (i=L, R). Coordinates $(u_i', v_i')$ on an input image are corrected to visual field coordinates $(u_i, v_i)$ by dot aspect ratio K and correspond to $(\theta_i, \phi_i)$, incident direction to the visual point, where $(I_u^i, I_v^i)$ is the image center. $(u_{per}^i, v_{per}^i)$ are perspective coordinates transformed from visual point coordinates using Equ. (2).

FIG. 12(b) shows left camera's visual point coordinate system $O_L$-$X_L Y_L Z_L$, robot coordinate system $O_c$-$X_c Y_c Z_c$ and world coordinate system $O_w$-$X_w Y_w Z_w$. It is assumed that road plane is ideally flat. In FIG. 12(b), $\psi_{1c}$ and $\psi_{2c}$ are deflection angles of binocular camera mover to the robot in pan and tilt directions respectively. The origin, $O_c$, of robot coordinates is the robot center and the world coordinates are $(X_{robo}, Y_{robo}, 0)$. P is a length from neck rotation axis to the robot center, H is height of camera's visual point from road plane and B is base line length between left and right camera's visual points, $\alpha$ is an angle between the $Y_c$ axis and the $Y_w$ axis.

Obstacle avoidance course is determined using 3D information obtained by passive parallel stereo method as a task of central vision. Determination of avoidance course is based on road map. Road map has two dimensional $X_w$ and $Y_w$ axes of world coordinate system, and has environmental information such as walls, road boundary lines, detected obstacles and so on. This road map is different from that often used in path planning research such as a Voronoi graph. FIG. 13(i) shows the way to presume an area where obstacles exist. Here a camera's view direction is assumed to be parallel to $Y_w$ axis. The steps involved are:

(a): Road plane is divided to small square blocks with a side of 5 [cm], (b), (c): Each 3D measured point (x, y, z) is voted to the corresponding blocks considering measurement errors caused by CCD element digitization. $\Delta y$ and $\Delta x$, errors in the directions of $Y_w$ ($Y_L$) axis and $X_w$ ($X_L$) axis respectively are calculated using Equs. (3) and (4).

$$\Delta y = \left|\frac{\partial y}{\partial \theta_L}\right|\cdot \Delta\theta_L + \left|\frac{\partial y}{\partial \theta_R}\right|\cdot \Delta\theta_R + \left|\frac{\partial y}{\partial \phi_L}\right|\cdot \Delta\phi_L + \left|\frac{\partial y}{\partial \phi_R}\right|\cdot \Delta\phi_R \quad (3)$$

$$\Delta x = \left|\frac{\partial x}{\partial \theta_L}\right|\cdot \Delta\theta_L + \left|\frac{\partial x}{\partial \theta_R}\right|\cdot \Delta\theta_R + \left|\frac{\partial x}{\partial \phi_L}\right|\cdot \Delta\phi_L + \left|\frac{\partial x}{\partial \phi_R}\right|\cdot \Delta\phi_R, \quad (4)$$

where $\Delta\theta_i$ and $\Delta\phi_i$ (i=L,R) are errors of incident angle in the radial and tangential directions of visual field respectively, caused by CCD element digitization. FIG. 13(ii) shows the above errors, and (d): The obstacle is presumed to exist in highlighted blocks based on a threshold.

FIG. 14(i) shows a flow to determine avoidance course on road map. The hatched area in each step shows that there are no obstacles. Obstacle information is given to road map with offset to avoid collision. White circles are data points on the determined avoidance course. Information of road boundary lines is acquired by algorithm of peripheral vision described in the next subsection.

FIG. 14(ii) shows contour graphs of depth error $\Delta y$ of each point on the plane including 2 camera's view lines. Here base line length B is 300 [mm]. The error is calculated based on Equs. (3) and (4) by computer simulation. Each value is represented as a ratio $\Delta y/y$. For a comparison, depth error by PHC lens image represented by Equ. (2), is shown. Broken lines are boundary lines of camera's view field, and the area inside them has binocular information. As shown in FIG. 14(ii), depth may be measured with higher accuracy in small incident angles to left camera by a WAF lens than by a PHC lens. PHC lens cannot measure depth within 2% error only inside the near range of about 0.6 m ahead. On the other hand, WAF lens can measure depth with the similar accuracy in the farther range of about 3.2 m ahead.

A method exists to obtain location and orientation from a single CCD camera using two road boundary lines projected in the peripheral area, as Two Parallel Line (TPL) algorithm described in FIGS. 15(a), 15(b), and 16. This method realizes to detect locational information with a higher accuracy, because the peripheral area has a higher resolution in tangential direction while having fewer pixels. Because a length of black circle with 30 degree in WAF image (FIG. 1(a)) is longer than that of FIG. 1(b). It is assumed that there are two parallel boundary lines ($l_A$ and $l_B$) on flat road plane and there is no rotation about the optical axis of the camera. In addition, road width W and height H of visual point from the road plane, are assumed to be known.

The left camera's visual point $O_L$ ($X_o^L, Z_o^L$) is calculated from two planes including each boundary line from coordinate system $O_L$-$X_L Y_L Z_L$ and a related coordinate system $O_L$-$X_L' Y_L' Z_L'$ which has the same origin as shown in FIG. 15(b). As to the $O_L$-$X_L' Y_L' Z_L'$, $Y_L'$ axis is parallel to two boundary lines and $X_L'$ axis is horizontal to road plane. These planes are represented as Equ. (5).

$$Z' = -a_i X' \quad (i = A, B) \quad (5)$$

$O_L(X_o^L, Z_o^L)$ is calculating using $a_i$. \quad (6)

$$\begin{cases} X_o^L = \dfrac{Wa_A}{a_A - a_B} - W/2 \\ Z_o^L = \dfrac{Wa_A a_B}{a_A - a_B} \end{cases}$$

Road width W is calculated from Equ. (7), because visual point height $H(=Z_o^L)$ is known. This means that it is possible to navigate a mobile robot in an unknown corridor environment as well.

$$W = H/a_A - H/a_B \quad (7)$$

Camera's view direction relative to boundary lines, represented by pan angle $\psi_1$ and tilt angle $\psi_2$, is calculated from the vanishing point in perspective coordinate system. Orientation $\alpha$ of a mobile robot in world coordinate system is represented as Equ. (8), when camera mover is deflected with pan angle $\psi_{1c}$ from robot coordinate system.

$$\alpha = \psi_1 - \psi_{1c} \quad (8)$$

FIG. 16 shows a flowchart of the TPL algorithm using Hough transform. This algorithm detects locational information rapidly, when parts of boundary lines are invisible by obstruction or lighting conditions.

If camera mover is fixed at the mobile robot, accuracy of the locational and 3D information ahead the road is reduced, as orientation of the mobile robot gets larger. Camera's view direction control solves this problem by keeping a view direction parallel to road boundary lines. Rotating angle $\Delta\psi_1$ is calculated from Equ. (9).

$$\Delta\psi_1 = -\psi_1 - (\hat{\alpha}_2 - \hat{\alpha}_1) \quad (9),$$

where $\hat{\alpha}_1$ is an estimated value of mobile robot orientation just after image input, based on odometry, and $\hat{\alpha}_2$ is an estimated value just after locational information is calculated from the peripheral area.

Locational information of the mobile robot is revised periodically with $\alpha - (\hat{\alpha}_2 - \hat{\alpha}_1)$ and $X_{robo} - (\hat{X}_{robo2} - \hat{X}_{robo1})$, where $\hat{X}_{roboi}$ is a value of mobile robot location by odometry just after image input (i=1) and just after locational information is calculated (i=2). If a road width calculated from Equ. (7) is much different with the known width W, locational information is not revised.

When using the TPL algorithm, the optimal value of height h of camera's visual point to detect camera's horizontal position w accurately exists. The relation between w and h is examined by computer simulation, when camera's view direction is parallel to road boundary lines. FIG. 17 shows two projected road boundary lines (represented by $\phi_n$ (n=A, B)) in visual field coordinate system. Measured error, $\Delta w$, of horizontal position caused by CCD digitization errors, $\Delta\phi_A$ and $\Delta\phi_B$, is calculated from Equs. (10) and (12).

$$\begin{cases} \Delta\phi_n = \dfrac{1}{r|\cos\phi_n|} & \left(-\pi \le \phi_n \le -\dfrac{3}{4}\pi, -\dfrac{1}{4}\pi \le \phi_n \le \dfrac{1}{4}\pi, \dfrac{3}{4}\pi \le \phi_n \le \pi\right), \\ \dfrac{1}{r|\sin\phi_n|} & \left(-\dfrac{3}{4}\pi \le \phi_n \le -\dfrac{1}{4}\pi, \dfrac{1}{4}\pi \le \phi_n \le \dfrac{3}{4}\right), \end{cases}$$ (10)

where $n$ is A or B.

$$w = \frac{W \tan\phi_A}{\tan\phi_A - \tan\phi_B}$$ (11)

$$\Delta w = \left|\frac{\partial w}{\partial \phi_A}\right|\Delta\phi_1 + \left|\frac{\partial w}{\partial \phi_B}\right|\Delta\phi_B$$ (12)

FIG. 18 shows contour graphs of error Δw in each position (w/W, h/W). FIG. 18(a) is from the WAF lens and FIG. 18(b) is from the PHC lens. Each value of Δw is represented with percentage of road width W. Δw is calculated from $\Delta\phi_A$ and $\Delta\phi_B$ on a circle with a radius of 0.875 and those on a circle with a radius of 0.405 as to WAF lens and PHC lens, respectively. These radii correspond to about 35 degree incident angle. There is the height of visual point to make Δw minimum as to each horizontal position w (shown as a broken line in FIG. 18). The optimal height gets smaller, as w gets closer to zero or 1. The error becomes more sensitive to change of was h gets closer to zero and w gets closer to zero or 1. It is noted that the WAF lens can measure w with a higher accuracy than the PHC lens, because the resolution is higher in tangential direction of the same incident angle.

A mobile robot used for an experiment is shown in FIG. 19. It is a Front Wheel System vehicle with an active front wheel, for both driving and steering, and two rear wheels. On the robot, there are two computers for image processing and driving control of mobile robot, which run each process in parallel and share locational information of the mobile robot, by communication. Locational information is estimated from rotations measured by rotary encoders for driving and steering, and is revised by values detected from peripheral vision to improve quality of the planned course and navigation.

As shown in FIGS. 20(i)(a) and (b), two kinds of navigation experiment are carried out, where white boards (width 20 [cm]×height 55 [cm]) are placed as obstacles on a carpet (width 137.5 [cm]). Tilt angle $\psi_2$ of left camera's view direction, is 0 degrees, and height H of the camera's visual point is 64.5 [cm], and horizontal distance P between the robot center and neck rotation axis of camera mover is 53 [cm]. Collision offset between obstacles and the mobile robot is set with 20 [cm]. The mobile robot is set to move with velocity of about 10 [cm/s].

FIG. 20(ii) shows results of the experiment. White triangles are target points on the planned courses, and black dots are points by $(X_{robo}, \hat{Y}_{robo})$ on actual courses, where $X_{robo}$ is a measured value by the TPL algorithm and $\hat{Y}_{robo}$ is an estimated value by odometry. Crosses are obstacles. They are plotted with world coordinates respectively. In these experiments, steering is controlled to follow trajectories based on cubic function fitted to target points. It seems that the gap between two courses is caused by delay of the steering control. A target point close to 300 mm in FIG. 20(ii)(b) is influenced by errors of locational information from the TPL algorithm.

A fovea sensor gives a foveated image having a resolution that is higher in the central FOV and decreases rapidly as going from a central area to the periphery. That is, the resolution of the fovea sensor is space-variant. Thus, the fovea sensor functions by wide-angle FOV and in detail in the central FOV using largely-reduced number of data. Log-polar mapping is often used for a model of the foveated image. The log-polar mapping is inspired by analytic formulation from biological observation of the primate visual system. Log-polar is applied this to computer vision computationally and to produce a log-polar vision chip with CCD or CMOS technologies. The log-polar mapping is not only effective for a drastic reduction in image data, as the human retina does, but is also suitable for generating geometrical rotation and scale-invariant feature easily.

Another method and a wide-angle lens exist to acquire the foveated image. Such a wide-angle lens combines a specially-made Wide Angle Foveated (WAF) lens with a commercially available conventional Cartesian linear-coordinate vision chip, where photosensitive elements are arranged uniformly. On the other hand, the former approach combines a conventional lens with the log-polar chip, where the size of photosensitive element is uniform in the fovea and changes logarithmically in periphery.

A special wide-angle lens is known as a model that combines planar projection and spherical projection. This lens achieves foveation by distorting a part of spherical projection using a logarithmic curve in order to bridge 'linear' planar projection and 'linear' spherical projection. This part of the FOV, that is, spherical logarithmic part, has rotation- and scale-invariant (RS-invariant) property.

BRIEF SUMMARY

Embodiments of the present disclosure provide a system and method for making an imaging model and an imaging apparatus. The present disclosure teaches how to make an imaging model and a system.

Briefly described, in architecture, one embodiment of the system, among others, can be implemented as follows.

An apparatus for image processing may include an optical element having a field of view, an image sectoring element coupled to the optical element, the image sectoring element configured to sector the field of view in a plurality of areas, and an image processor coupled to the image sectoring element, the image processor configured to process an image in accordance with the plurality of areas.

The present disclosure can also be viewed as providing a method of modeling an image. The method may include providing an optical element, assigning a field of view of the optical element, sectoring the field of view in a plurality of areas, and processing an image in accordance with the plurality of sectored areas.

Other systems, methods, features, and advantages of the present invention will be, or will become apparent, to a person having ordinary skill in the art upon examination of the following drawings and detailed description. It is intended that all such additional systems, methods, features, and advantages included within this description, be within the scope of the present disclosure, and be protected by the accompanying claims.

BRIEF DESCRIPTION OF THE SEVERAL VIEWS OF THE DRAWINGS

Many aspects of the disclosure can be better understood with reference to the following drawings. Components in the drawings are not necessarily to scale, emphasis instead being placed upon clearly illustrating principles of the present invention. Moreover, in the drawing, like-referenced numerals designate corresponding parts throughout the several views.

FIG. 35(iii) shows polar images of AdWAF image, LP lens image and K lens image when $r_{max}=64$, $\theta_{max}=\pi/3$, $\theta_0=2.584$ [°], $\theta_1=20.0$ [°] and $\theta_2=34.715$ [°].

DETAILED DESCRIPTION

The present disclosure relates to a system and method for making an imaging model and an imaging apparatus.

As a person having an ordinary skill in the art would appreciate, an arrow entering a block or a symbol indicates an input and an arrow leaving a block or a symbol indicates an output. Similarly, connections described below may be of any electromagnetic type, such as electrical, optical, radio-frequency, and magnetic.

I. An Embodiment of the AdWAF Model
A. Modeling

Figure 21:
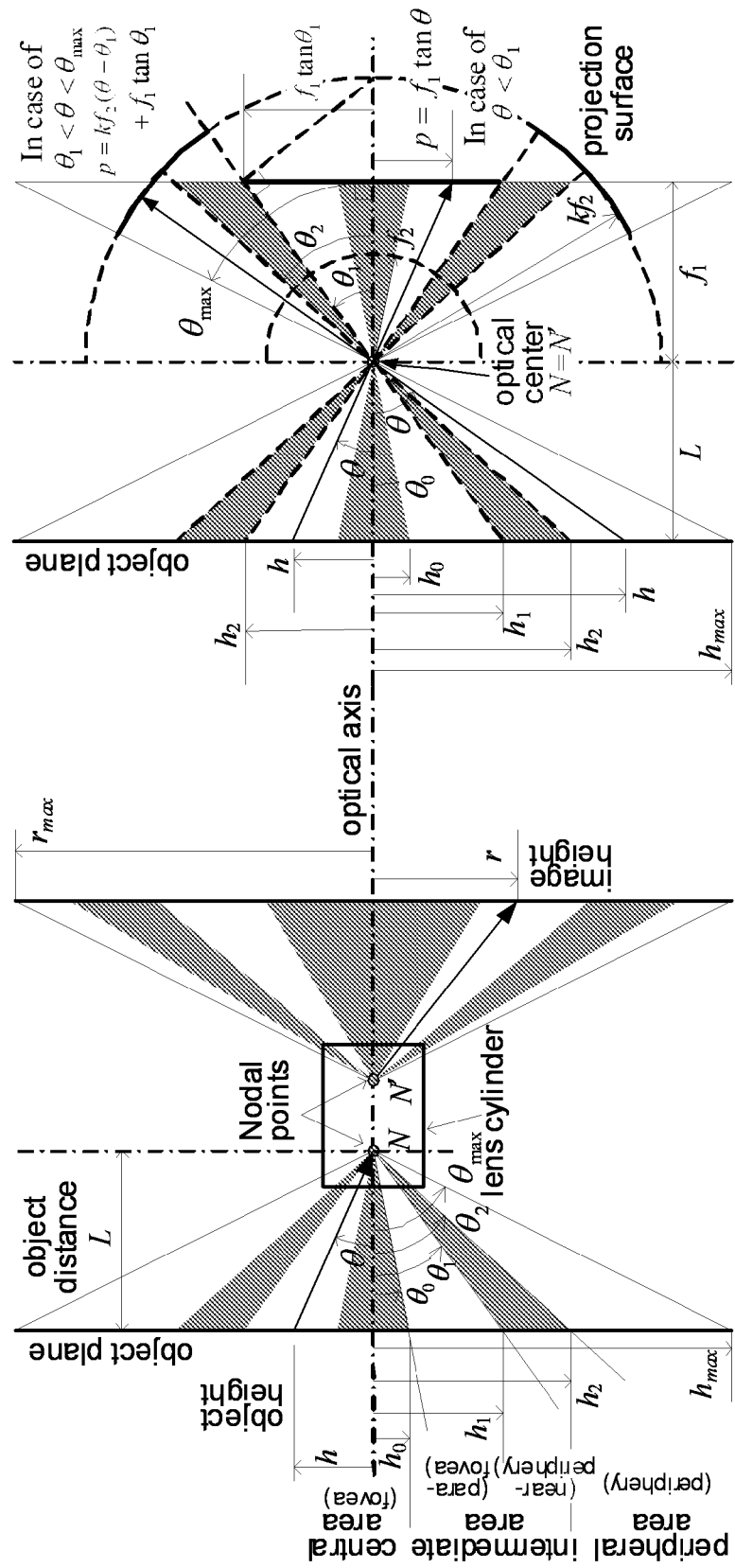
FIG. 21 shows an embodiment of a camera model of the present disclosure based on combination of planer projection and spherical projection.

A relatively correct LP image from the input image by the WAF lens is extracted based on camera calibration. FIG. 21 shows a geometrical sketch of the an embodiment of a camera model, which is based on a combination of planar projection (PP), that is, a perspective projection by tangent of incident angle, $\theta$, to the lens optical center, and spherical projection (SP), that is, linear to $\theta$. The projection height, p, of this camera model is defined as follows:

if the section of $\theta$ is $0 \leq \theta \leq \theta_1$, $p = f_1 \tan \theta$, \hfill (13)

else if $\theta_1 \leq \theta \leq \theta_{max}(=\pi/3 \text{ [rad]})$, $p = k \cdot f_2(\theta - \theta_1) + f_1 \tan \theta_1$, \hfill (14)

where $f_1$ and $f_2$ are focal lengths to the projection plane and the SP surface, respectively, and k is a correction factor for continuity of both projections, $$k = \frac{f_1}{f_2 \cos^2\theta_1}. \quad (15)$$

A model of the WAF image, namely Advanced WAF (Ad-WAF) imaging, is defined by the following equations, combining both PP by Equ. 13 and SP by Equ. 14 with both Cartesian and logarithmic coordinates:

if $0 \le \theta \le \theta_0$, (16)
$r = r_{max} c_1 f_1 \tan\theta$, else if $\theta_0 \le \theta \le \theta_1$, (17)
$r = r_{max}(c_2 \log_a c_1 f_1 \tan\theta + d_1)$, else if $\theta_1 \le \theta \le \theta_2$, (18)
$r = r_{max}\left\{c_3 \log_a\left(\frac{k \cdot f_2(\theta - \theta_1)}{c_1 f_1 \tan\theta_1} + 1\right) + d_2\right\}$, else if $\theta_2 \le \theta \le \theta_{max}$, (19)
$r = r_{max}\{c_4 f_2(\theta - \theta_2) + d_3\}$, where r is the image height corresponding to $\theta$, $r_{max}$ is the maximum height when $\theta = \theta_{max}$, and $c_i$ (i=1, 2, 3, 4) is a scale modification factor for adjusting the height of partial images extracted from each section of $\theta$. Further, $d_i$ (i=1, 2, 3) is $$d_1 = c_1 f_1 \tan\theta_0 - c_2 \log_a(c_1 f_1 \tan\theta_0), \quad (20)$$

$$d_2 = c_2 \log_a(c_1 f_1 \tan\theta_1) + d_1, \quad (21)$$

$$d_3 = c_3 \log_a\left(\frac{k \cdot f_2(\theta_2 - \theta_1)}{c_1 f_1 \tan\theta_1} + 1\right) + d_2. \quad (22)$$

Here, if $c_1 = c_2 = c_3 = c_4$, and r = 1 when $\theta_{max} = \pi/3$, then $$k = \frac{\theta_2 - \theta_1 + \cos\theta_1 \tan\theta_1}{\cos^2\theta_1 \tan\theta_0}. \quad (23)$$

$$f_1 = bL, \quad (24)$$

$$f_2 = \frac{f_1 \tan\theta_0}{\theta_2 - \theta_1 + \cos^2\theta_1 \tan\theta_1}, \quad (25)$$

$$a = \exp\left(\frac{1}{f_1 \tan\theta_0}\right), \quad (26)$$

where L is the object distance, that is, a distance from the optical center to the object plane, and b is given by $$b = \frac{1}{L\tan\theta_0} \bigg/ \left(\frac{\pi/3 - \theta_2}{\theta_2 - \theta_1 + \cos^2\theta_1 \tan\theta_1} + \log\frac{\theta_2 - \theta_1 + \cos^2\theta_1 \tan\theta_1}{\cos^2\theta_1 \tan\theta_0} + 1\right). \quad (27)$$

In this case, not only (16)-(19) are continuous but also their derivatives are continuous.

Figure 22:
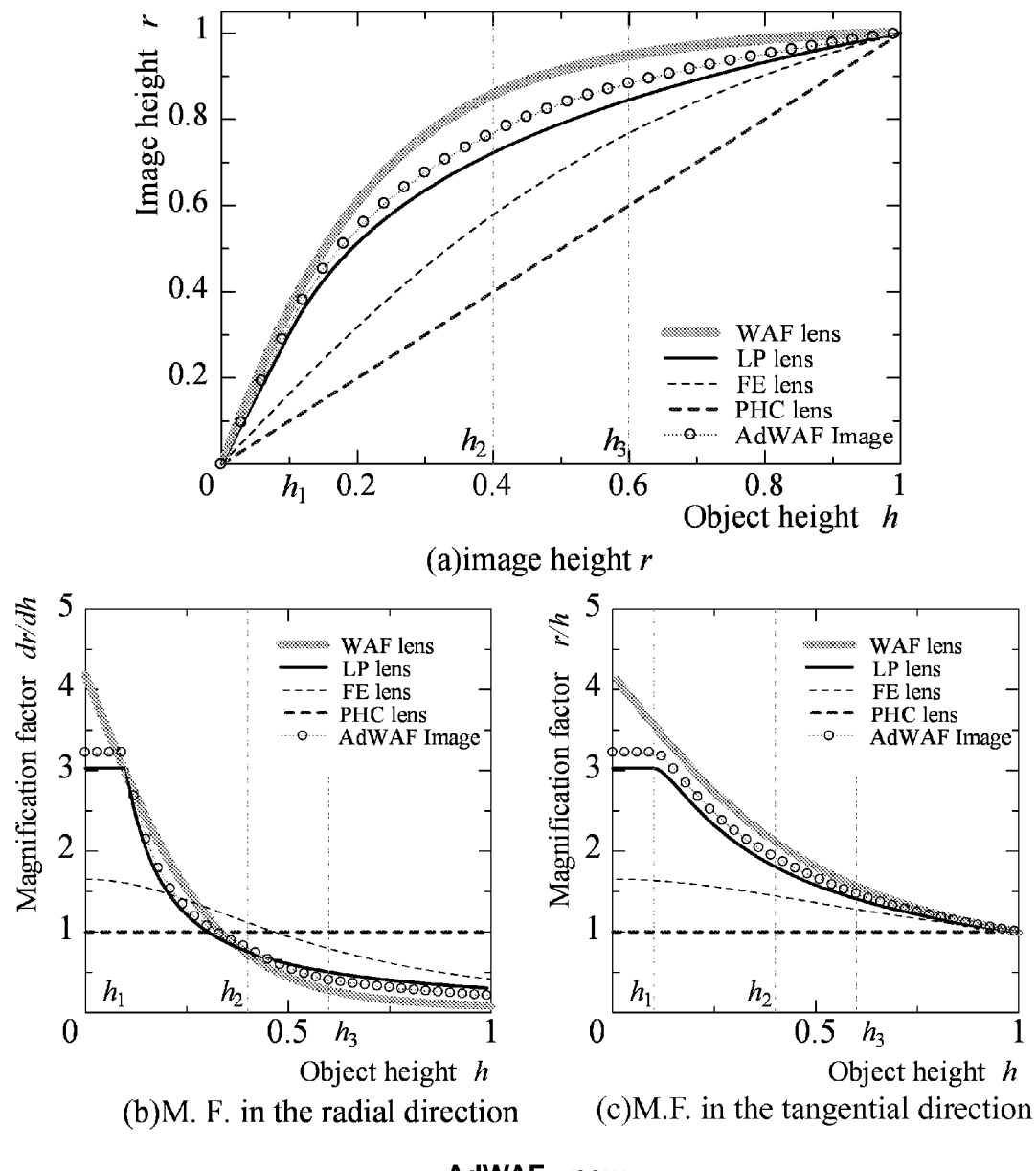
FIG. 22 shows a plots for an AdWAF image in terms of object height.

FIG. 22 shows the image height r, the M.F. dr/dh and r/h in the radial and tangential directions as pertaining to the AdWAF image, respectively, in terms of the object height h, with those of other types of lens. The $h_{max}$ and $r_{max}$ are normalized to 1 (when $\theta_{max} = \pi/3$) to compare every type easily. The boundaries of FOV, $h_0$, $h_1$ and $h_2$ are 0.1 (=9.826 [°]), 0.4 (=19.107 [°]), and 0.6 (=34.715 [°]), respectively, in case of FIG. 22. Other types of lens, that is, the LP lens, Fish eye (FE) lens, the PHC lens and the WAF lens are defined as:

LP lens: (28)
if $0 \le \theta \le \theta_0$ (fovea),
$r = r_{max} f_{lp} \tan\theta$,
else if $\theta_0 \le \theta \le \theta_{max}$ (periphery), $$r = r_{max}\{\log_{a_{lp}}(f_{lp}\tan\theta) + d_{lp}\}. \quad (29)$$

where $d_{lp}$ is denoted as $$d_{lp} = f_{lp}\tan\theta_0 - \log_{a_{lp}}(f_{lp}\tan\theta_0), \quad (30)$$

a focal length $f_{lp}$ is denoted as $$f_{lp} = \frac{1}{\{1 + \log(\tan\theta_{max}/\tan\theta_0)\}\tan\theta_0}, \quad (31)$$

a basis $a_{lp}$ is denoted as $$a_{lp} = \exp\left(\frac{1}{f_{lp}\tan\theta_0}\right), \quad (32)$$

such that Equs. (47) and (48) are continuous at $\theta = \theta_0$, and their derivatives are also continuous. Note that the LP lens is equivalent with the disclosed AdWAF model when $\theta_1 = \theta_2 = \theta_{max}$, $c_0 = c_1 = 1$ and $c_2 = c_3 = 0$. Its fovea and 'periphery' correspond to the fovea and para-fovea of the disclosed AdWAF model, respectively.

FE lens: (33)
$$r = \frac{r_{max}}{\theta_{max}}\theta \ (0 \le \theta \le \theta_{max}),$$

PHC lens: (34)
$$r = \frac{r_{max}}{\tan\theta_{max}} \ (0 \le \theta \le \theta_{max}),$$

WAF lens:
$$r = r_{max}(a_0\theta^3 + a_1\theta^2 + a_2\theta) \ (0 \le \theta \le \theta_{max}). \quad (35)$$

A bold solid line shows the WAF lens. The distribution of its image height and M.F. is characterized by the design concept of the WAF lens, that is, acquiring much wider FOV and higher resolution locally in the central FOV. Its M.F in the radial direction is much higher than that of the PHC lens (a bold broken line) and the FE lens (a fine broken line) in small incident angles, on the other hand, lower than those of the PHC and FE lenses in large incident angles. Comparing with the LP lens (a solid line), one notes that the disclosed AdWAF model (a fine solid line with circle) can acquire higher M.F. in the central area ($0 \le h \le h_0$), by the same number of data, because of the AdWAF model having a lower M.F. in the intermediate and peripheral areas. The modification factor $c_i$ is used for the M.F. of the AdWAF image in order not to exceed that of the WAF lens. Additionally, if $r_{max}$ is 0.93 in the AdWAF model, the modificative M.F. is nearly equivalent to the M.F. of the LP lens in the central area, as shown in FIG. 22(b). Therefore, this means that the AdWAF model can reduce more pixels in the peripheral FOV than the LP lens.

The entire FOV is divided into three areas, that is, the central area ($0 \le \theta \le \theta_0$), the intermediate area ($\theta_0 \le \theta \le \theta_2$) and the peripheral area ($\theta_2 \le \theta \le \theta_{max}$) as shown in FIG. 21. The AdWAF model divides these three areas further into four areas by a boundary $\theta_2$ between the PP and the SP. The PP and SP parts in the logarithmic area are named para-fovea and near-periphery, respectively. The para-fovea should preferably be used for central vision such as pattern recognition, and the near-periphery should preferably be used more for peripheral vision. The central area (fovea) is a planar Cartesian area, because the image height r is linear to the object height h in this area. On the other hand, the peripheral area (periphery) is a spherical Cartesian area, because the r is linear to the incident angle θ.

B. Image Extraction

Figure 1:
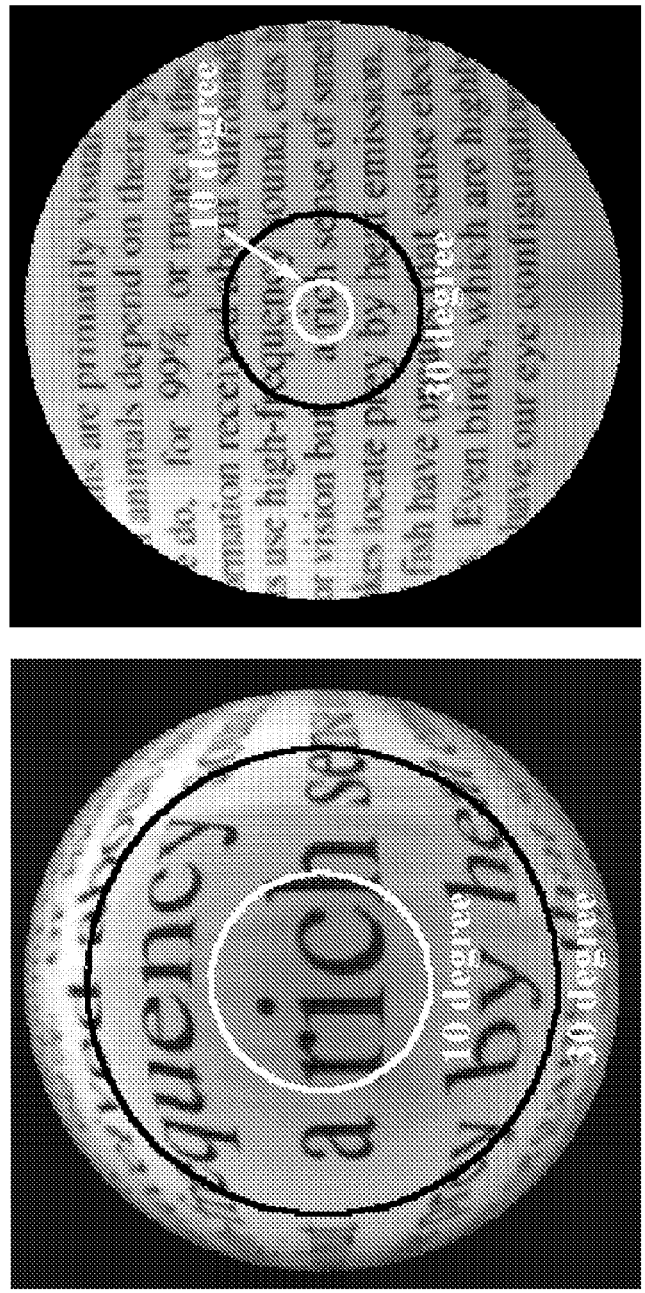
FIG. 1 shows images of WAF lens and pinhole camera (PHC) lens.
Figure 2:
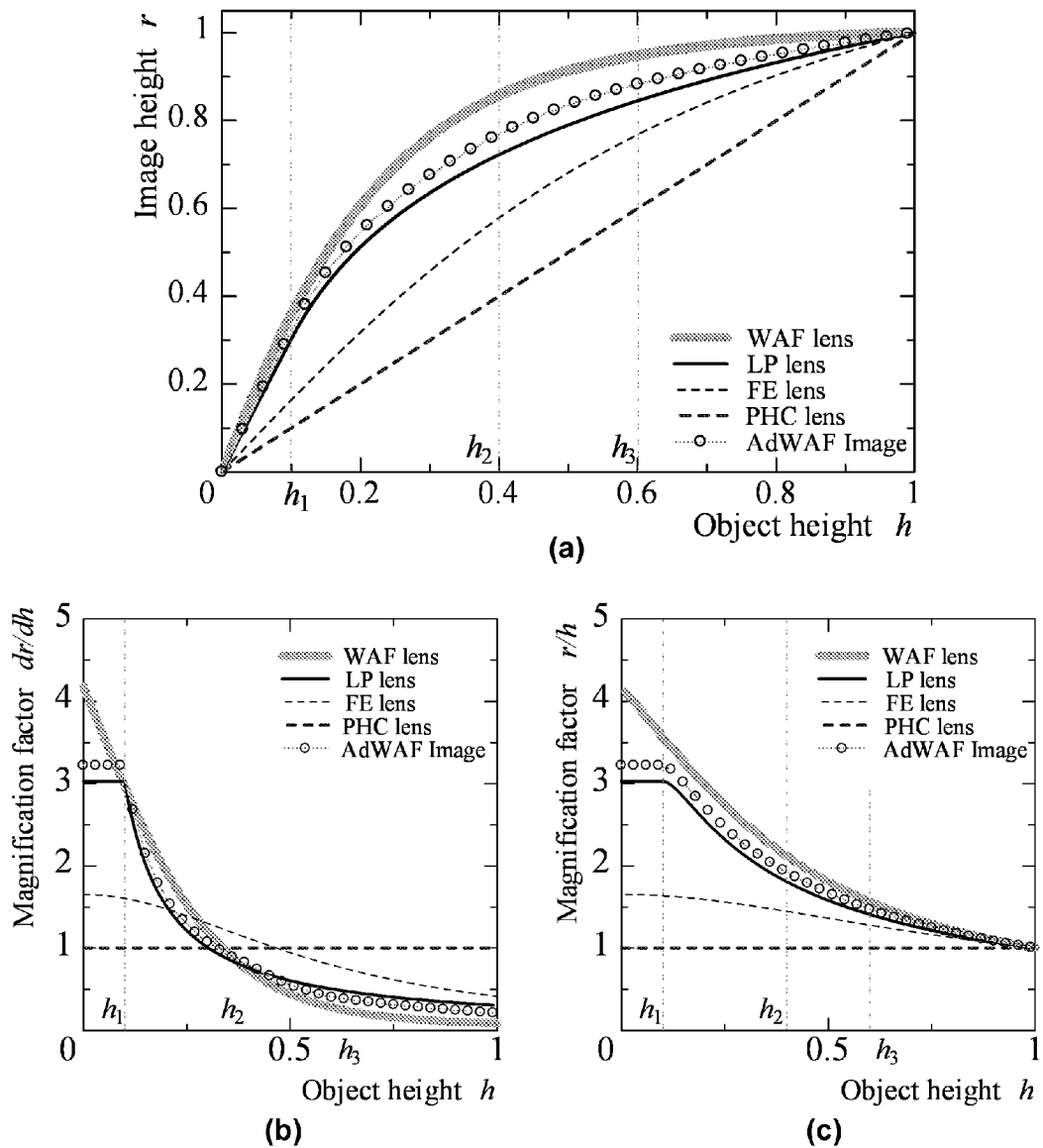
FIG. 2 shows a comparison of plots of prior-art lenses, in terms of object height.
Figure 3:
FIG. 3 shows a simulation of WAF lens, LP lens, lens, PHC lens (Prior-art) images.
Figure 3:
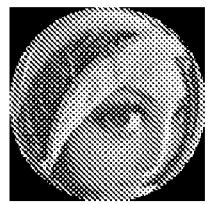
Figure 3:
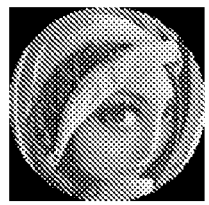
Figure 3:
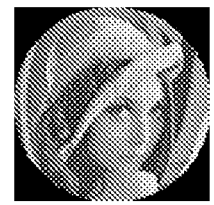
Figure 3:
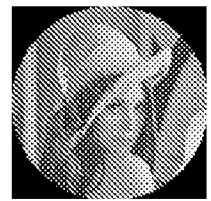
Figure 4:
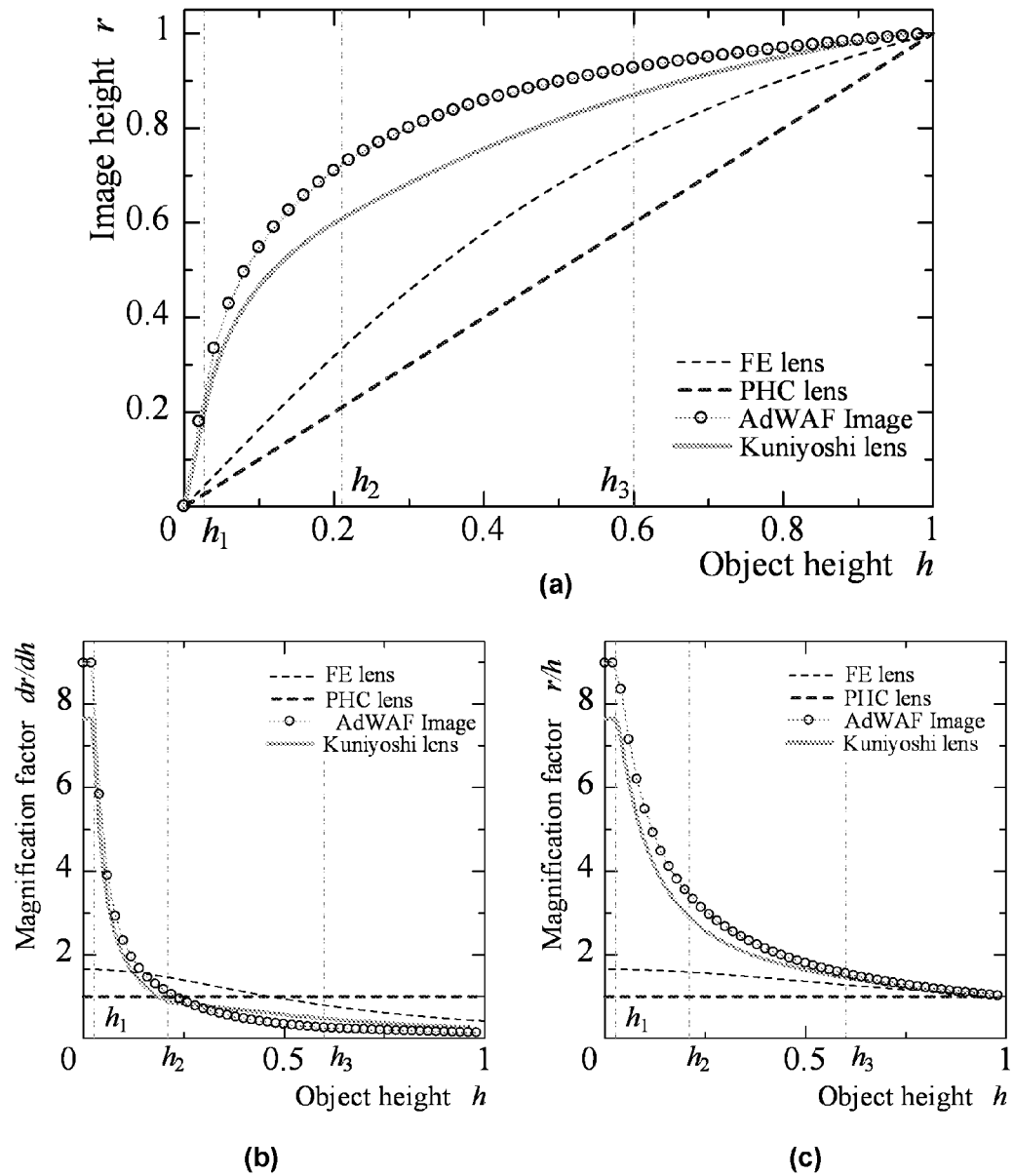
FIG. 4 shows a comparison of plots of prior-art lenses.
Figure 5:
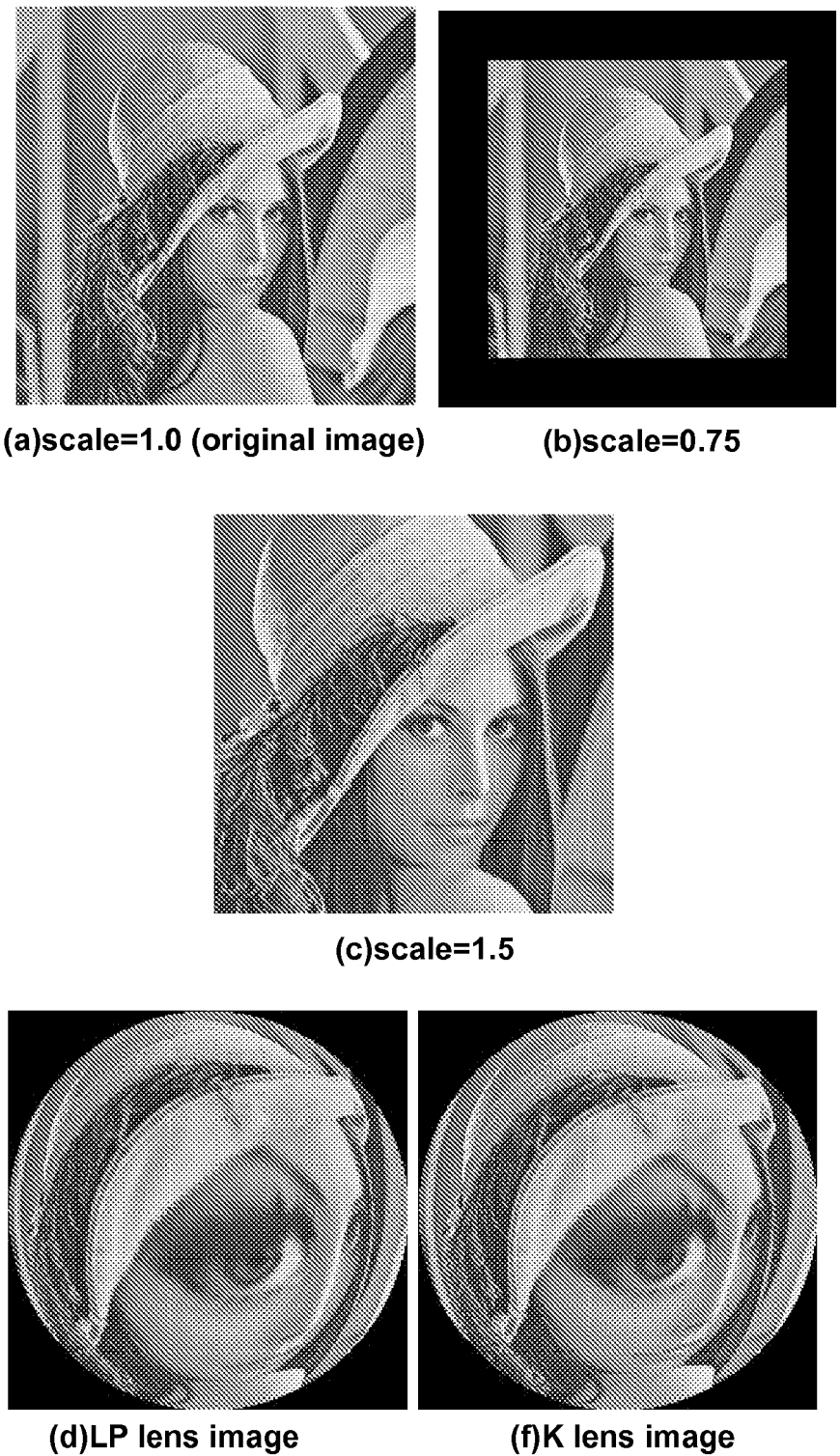
FIG. 5 shows test images with different scale, for prior art lenses such as LP lens image, and K lens image by distribution of M.F. of the actual K lens.
Figure 23:
FIG. 23 shows an original image and a simulation of an AdWAF image.
Figure 23:
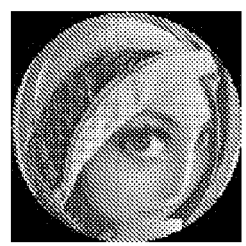

FIG. 23 simulates the AdWAF image, by a whole view, under conditions of $r_{max}$=64[pixel], $\theta_{max}$=π/3, $h_{max}$=1, $h_0$=0.1, $h_1$=0.4, and $h_2$=0.6. Each image is extracted from the original image (FIG. 23(a)) having 512×512[pixel]. It should be noted that the AdWAF image obviously has a higher resolution in its central area than the LP lens (FIG. 3). On the other hand, the resolution of its peripheral area is of an order between the WAF lens and the LP lens (FIG. 3).

Figure 24:
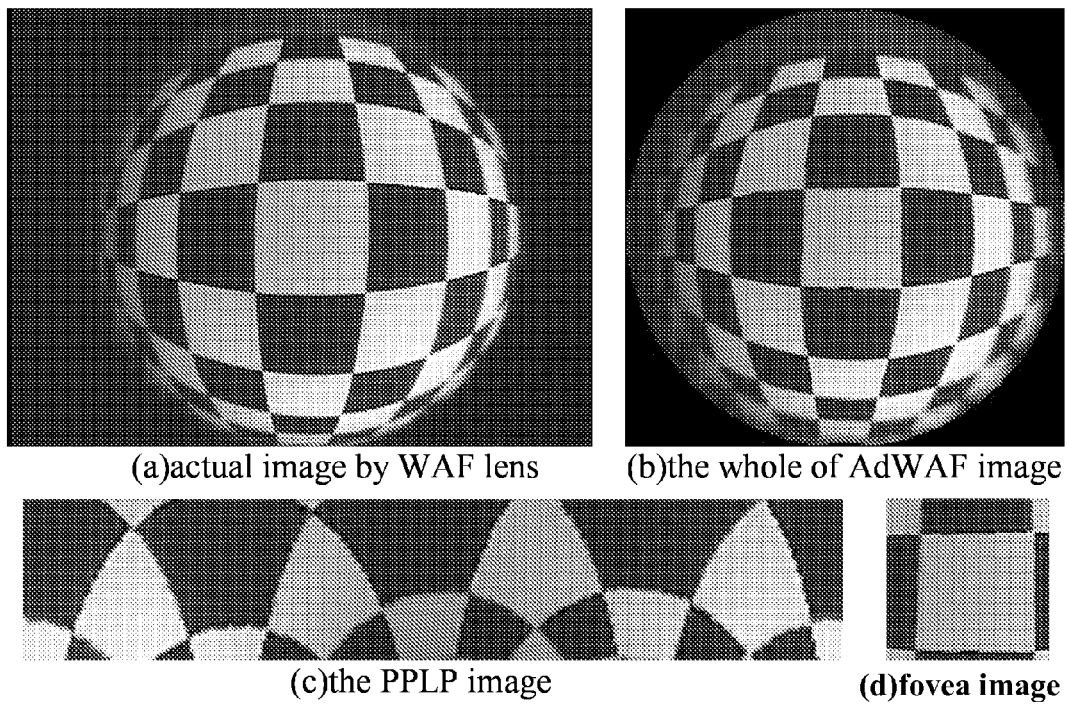
FIG. 24 shows an AdWAF image extracted from an actual image by WAF lens.

FIG. 24 shows the AdWAF image, actually extracted from the WAF lens under the same conditions as of the above simulation. FIG. 24(a), (b) and (c) are the extracted AdWAF images by the whole view, the para-fovea image, that is, by (17), and the fovea image by (16), respectively. The fovea image with Cartesian coordinates has only translation-invariant property.

C. Examination (i). Relation to K Lens

Figure 25:
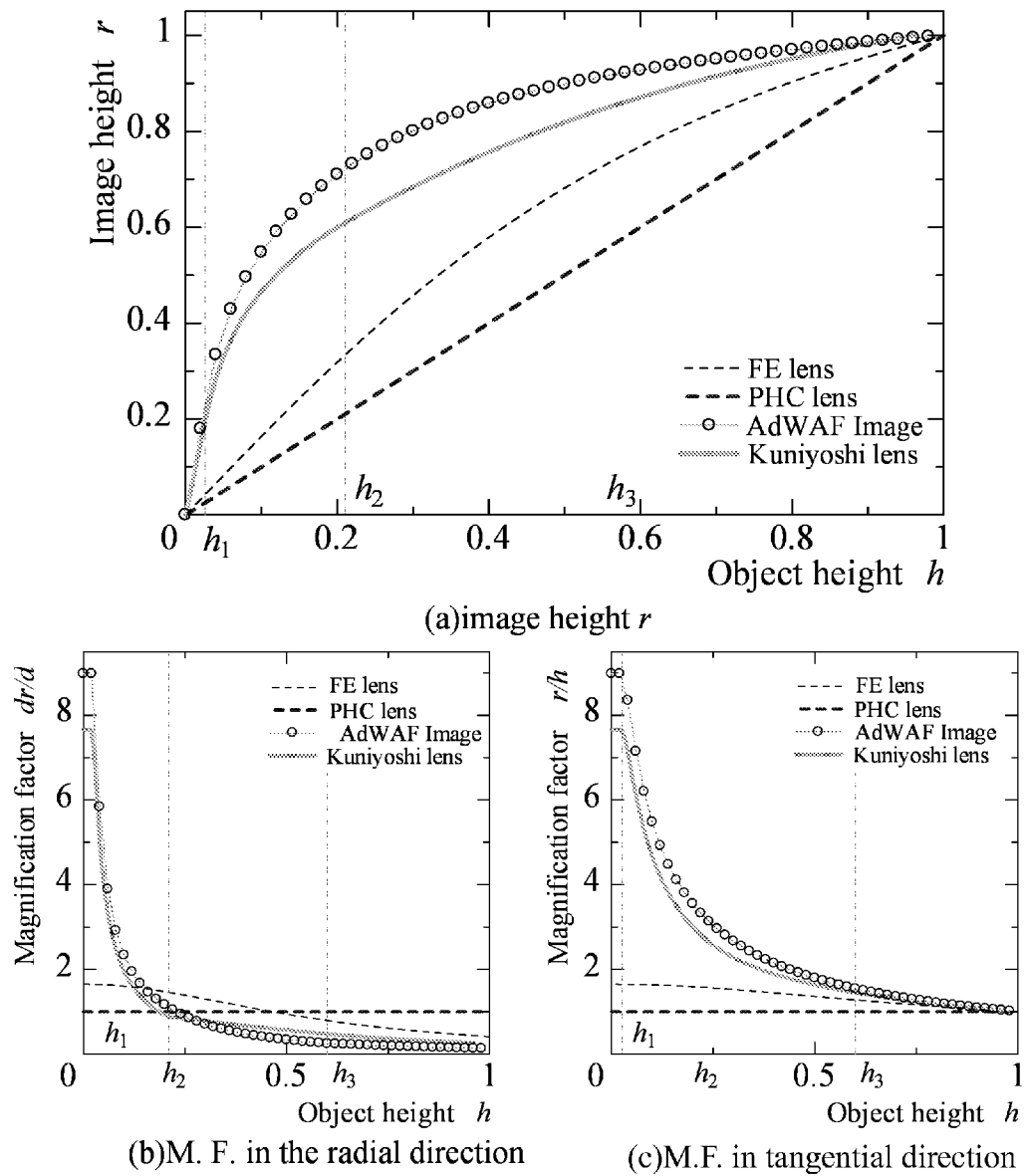
FIG. 25 shows plots for the AdWAF image.

FIG. 25 shows a comparison of the AdWAF model and Kuniyoshi's lens (K lens) as related to the disclosed AdWAF model, under conditions of $r_{max}$=1, $\theta_{max}$=π/3, $h_{max}$=1, $h_0$=0.026, $h_1$=0.21, and $h_2$=0.6, which are determined by the distribution of M.F. of an actual K lens. The values of $h_1$ and $h_2$, respectively, correspond to incident angles, $\theta_0$ (=2.584 [°]) and $\theta_1$ (=20.0 [°]), from boundaries in the K lens' FOV. The FE lens, the PHC lens, the K lens and the AdWAF model are shown by a fine broken line, a bold broken line, a bold solid line, and a fine solid line with circle, respectively. The K lens changes the image height logarithmically of θ in $h_0 \leq h \leq h_1$, and linearly to θ in $h_1 \leq h \leq h_{max}$. In the case when the first boundary $h_0$ (=$\theta_0$) is equal with the second boundary $h_1$ (=$\theta_1$) and the third boundary $h_2$ (=$\theta_2$) is equal with the second boundary of the K lens model they are consistent although Kuniyoshi assumes that two focal lengths, $f_1$ and $f_2$, to the PP and SP surfaces have the same value. It may be noted that this condition of the boundaries gives the disclosed AdWAF model a higher M.F. in its central area than the K lens, by the same number of data. On the other hand, if it has the same M.F. in its central area as the K lens, the $r_{max}$ is 0.85. Therefore, the disclosed AdWAF model in this case can reduce the number of data by about 28 percent.

(ii). Simulation Results

Figure 26:
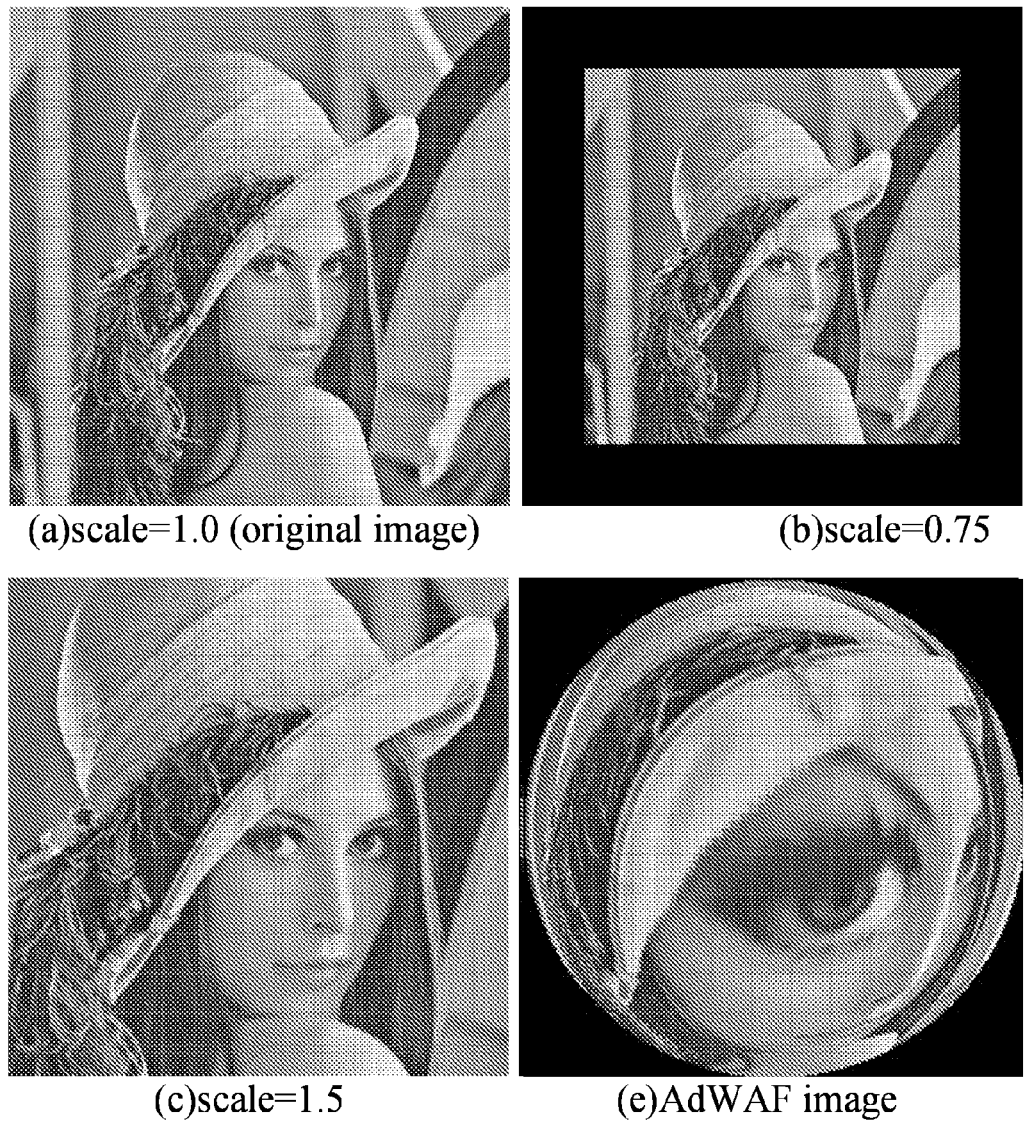
FIG. 26 shows test images with different scales, and an AdWAF image.

FIG. 26 shows test images with each different scale (α=0.75, 1 and 1.5) as related to the disclosed AdWAF model, extracted from FIG. 26(a) under conditions of $\theta_{max}$=π/3, $h_{max}$=1, $h_0$=0.026, $h_1$=0.21, and $h_2$=0.6.

Figure 6:
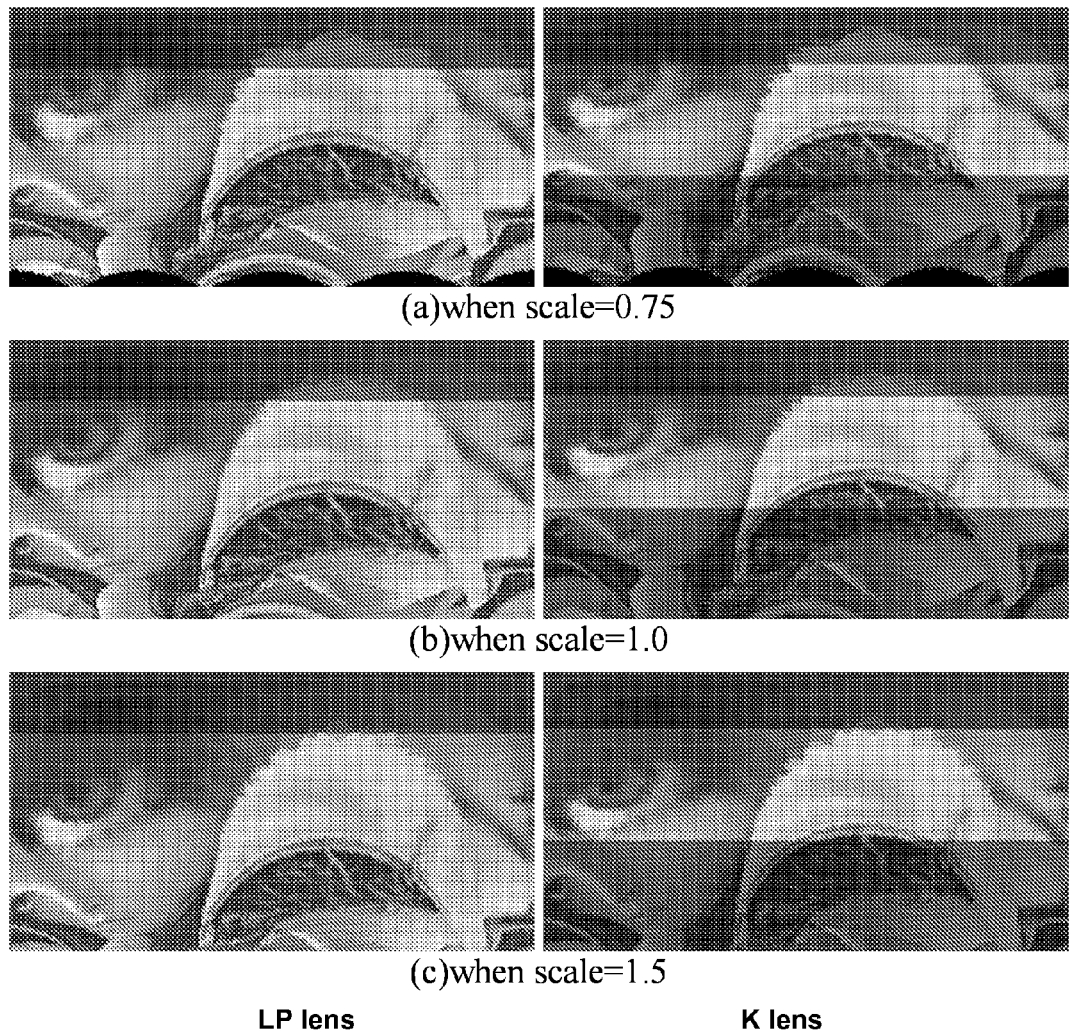
FIG. 6 shows LP images from prior art lenses such as the LP lens (left) and K lens image (right).
Figure 7:
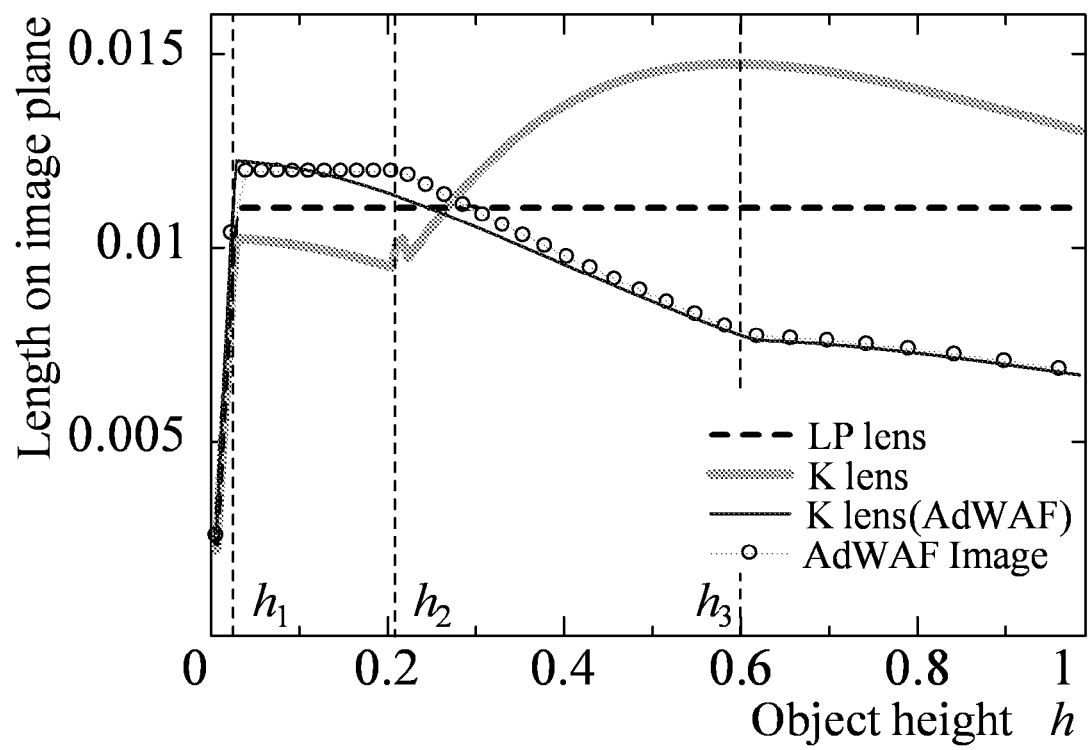
FIG. 7 shows an accuracy of scale-invariance by prior-art lenses such as LP lens, and K lens.
Figure 8:
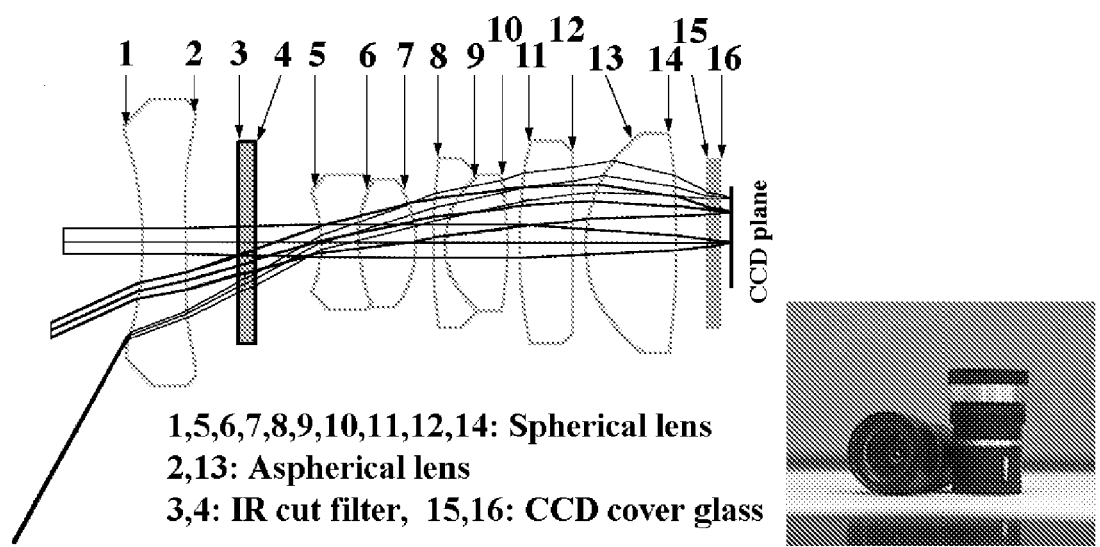
FIG. 8 shows a prior-art compound system and a picture of WAF lens.
Figure 9:
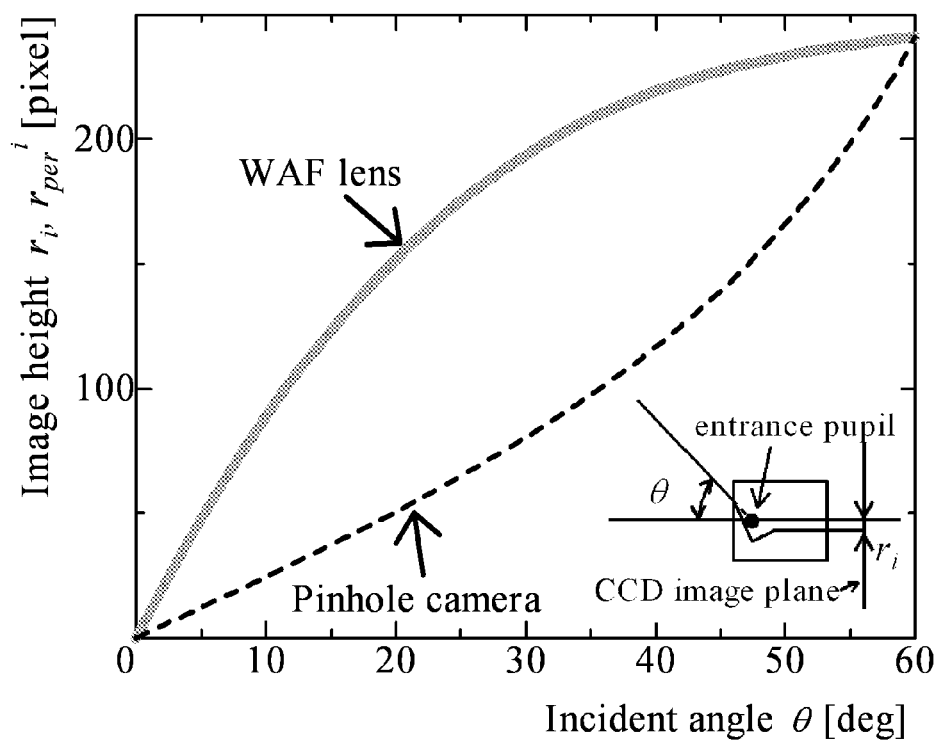
FIG. 9 shows an image height-incident angle plot of input images, shown in FIG. 1, of a prior-art WAF lens and pinhole camera.
Figure 10:
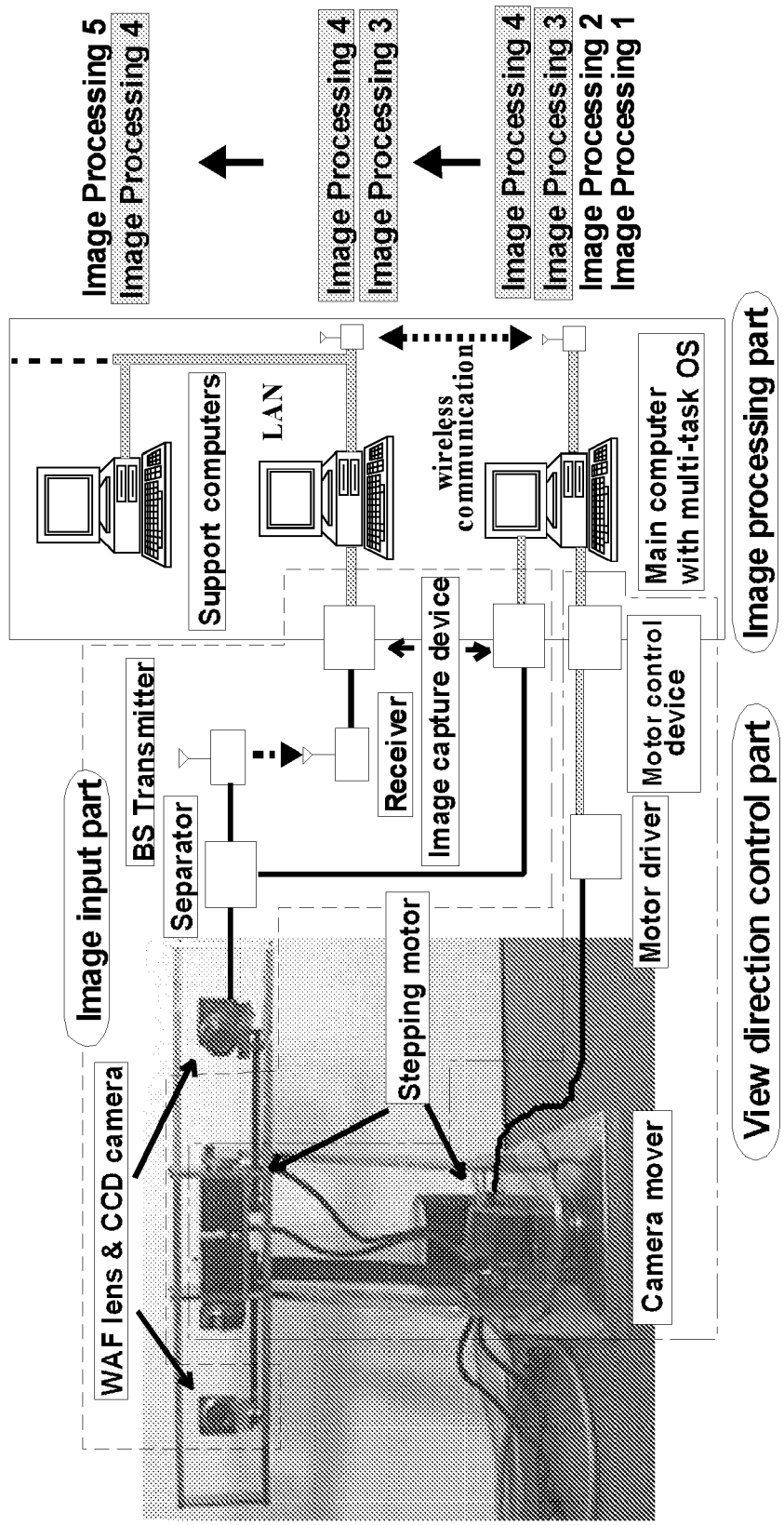
FIG. 10 shows a scheme of a prior-art WAFVS system and timely task distributing.
Figure 11A:
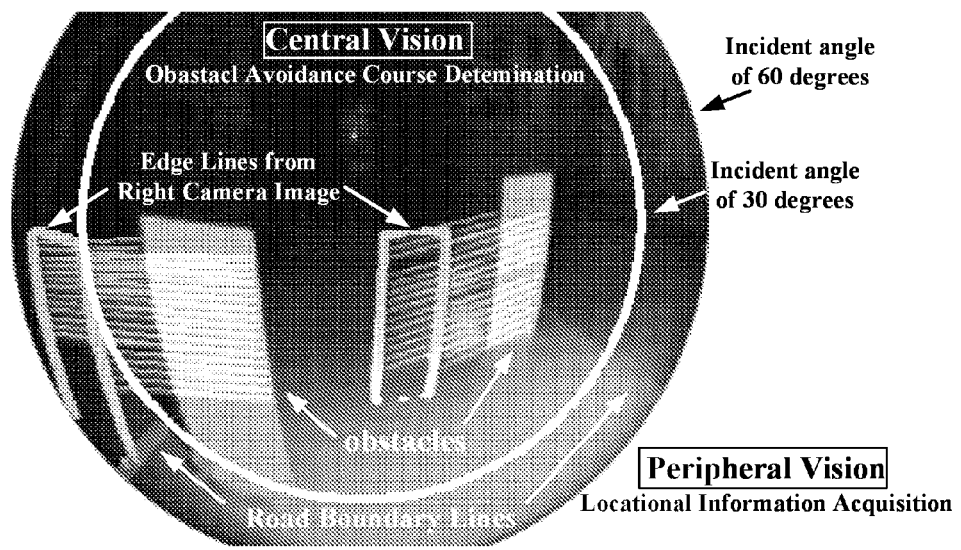
FIG. 11(a) shows navigation based on multi-functional use of a prior-art WAFVS.
Figure 11B:
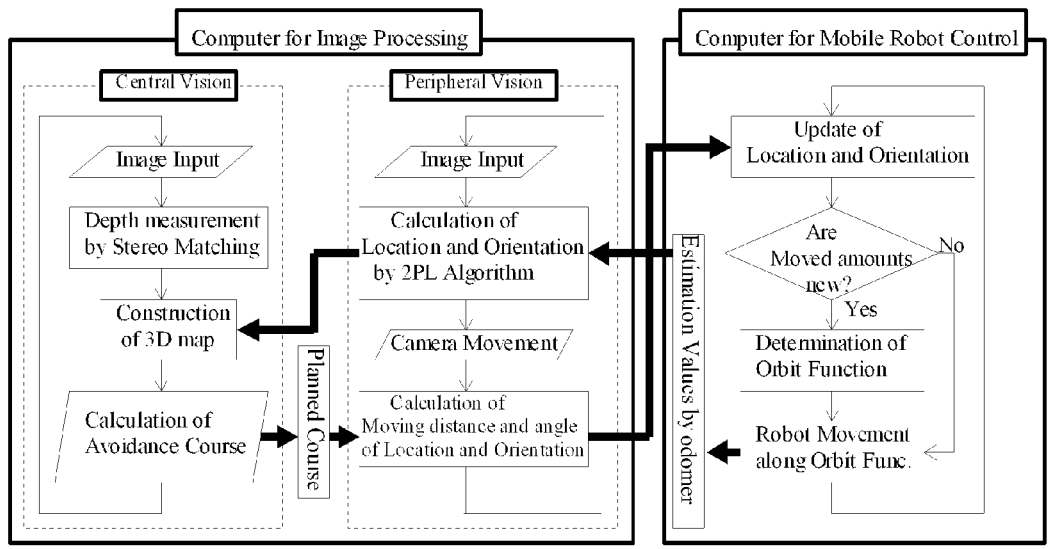
FIG. 11(b) shows a flow chart of cooperative navigation between a prior-art central vision and a prior-art peripheral vision.
Figure 12A:
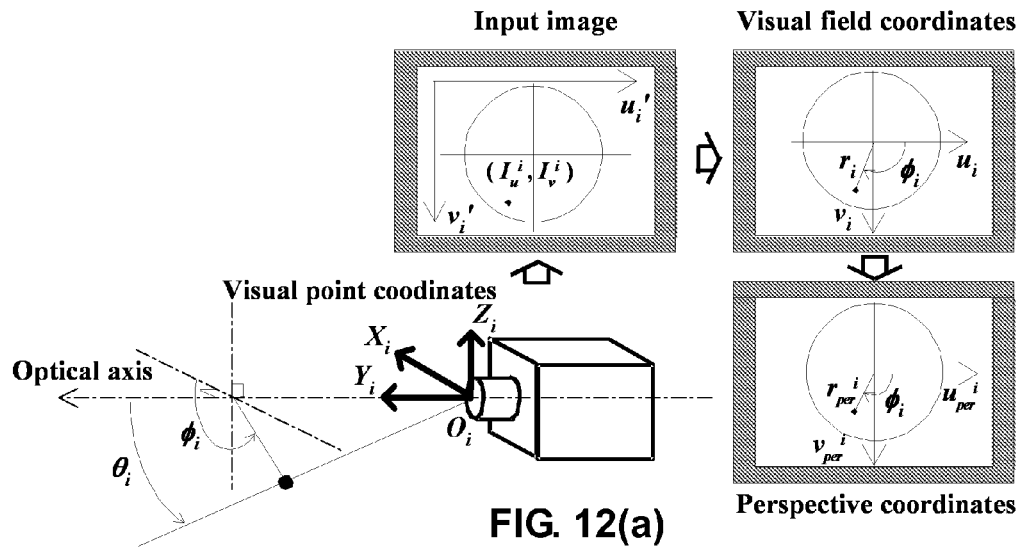
FIG. 12(a) shows visual field coordinates and visual point coordinates in prior art.
Figure 12B:
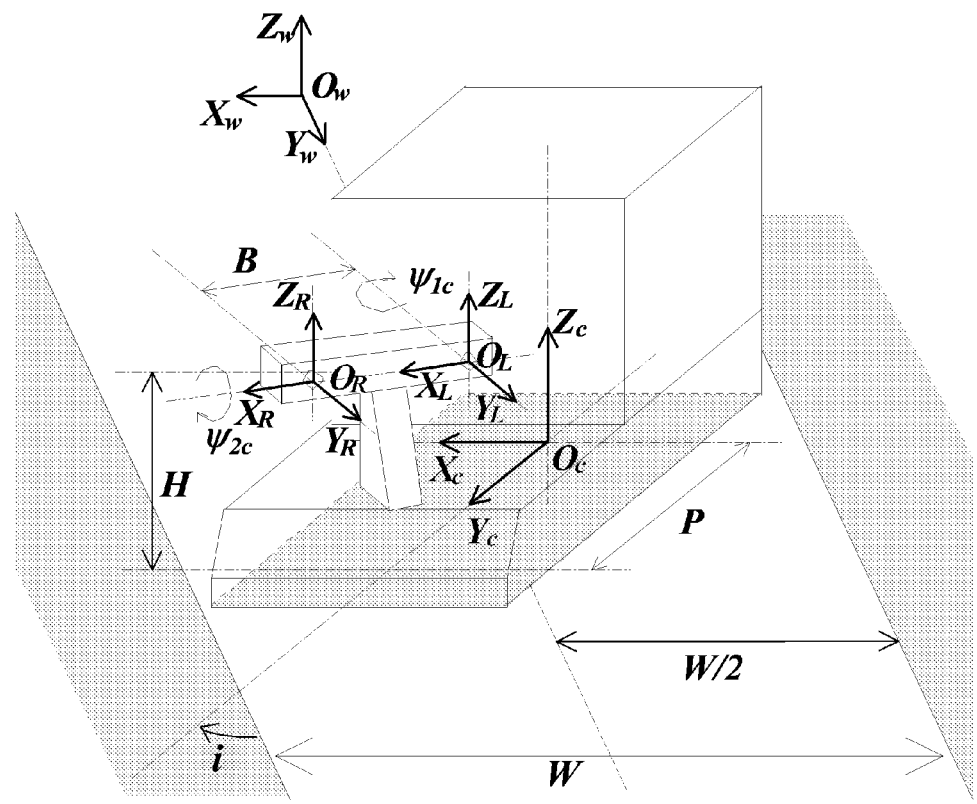
FIG. 12(b) shows Left camera's visual point coordinates, robot coordinates and world coordinates in prior art.
Figure 13I:
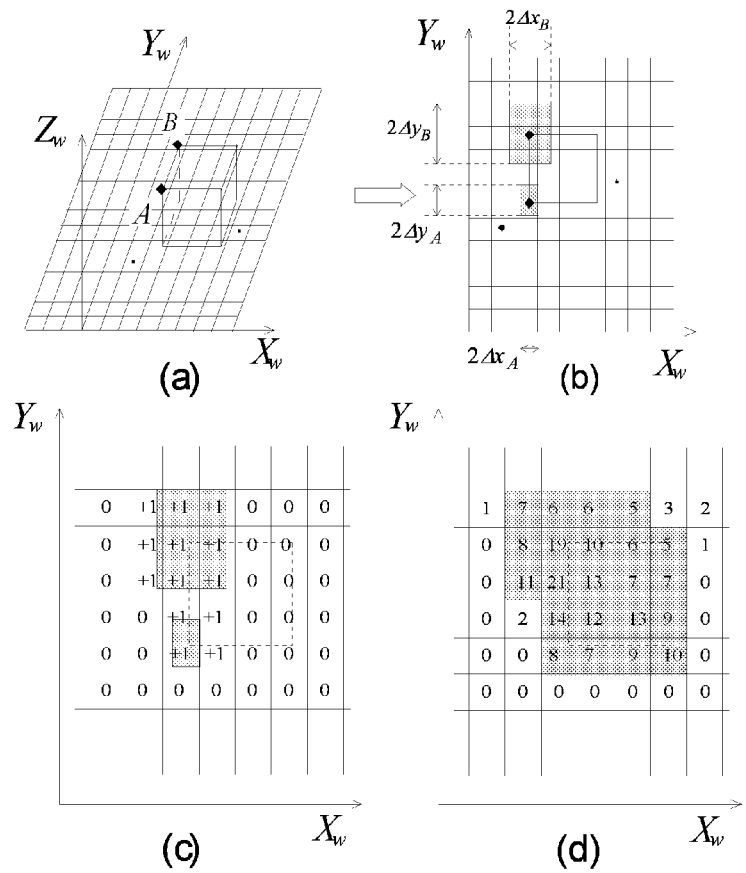
FIG. 13(i) shows a way to presume an area where obstacles exist.
Figure 13:
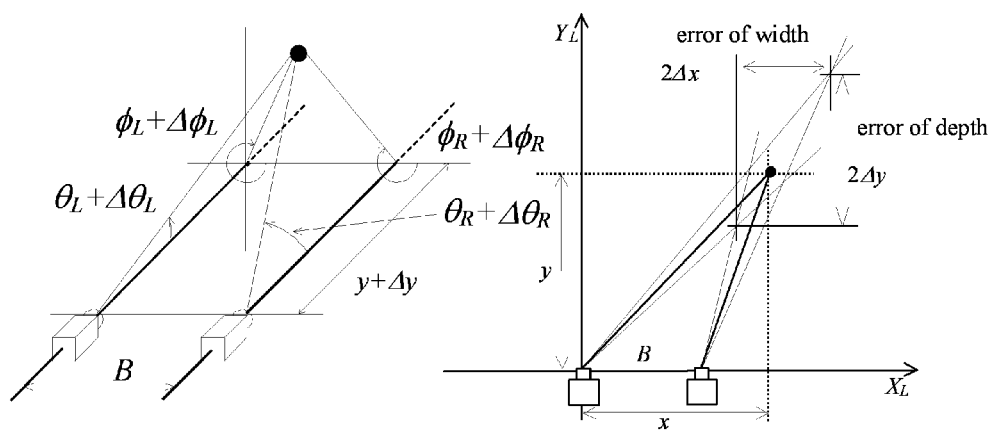
FIG. 13(ii) CCD digitization errors and depth error $\Delta y$ and width error $\Delta x$ of 3D measurement.
Figure 14I:
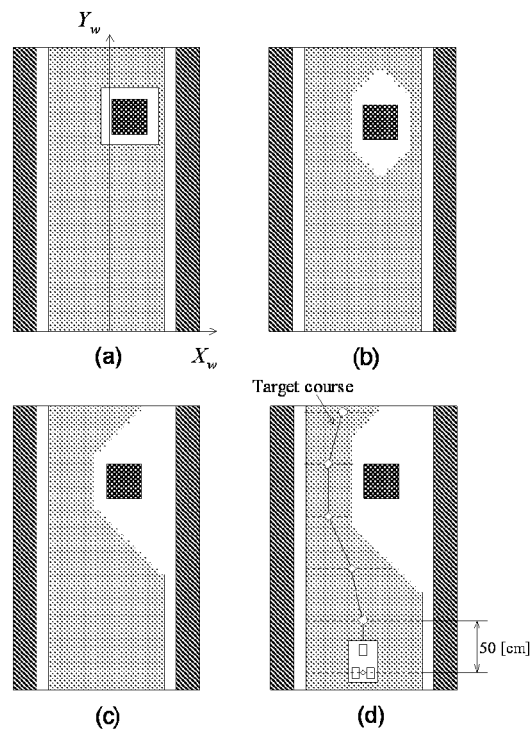
FIG. 14(i) shows a flow to plan obstacles avoidance course.
Figure 14:
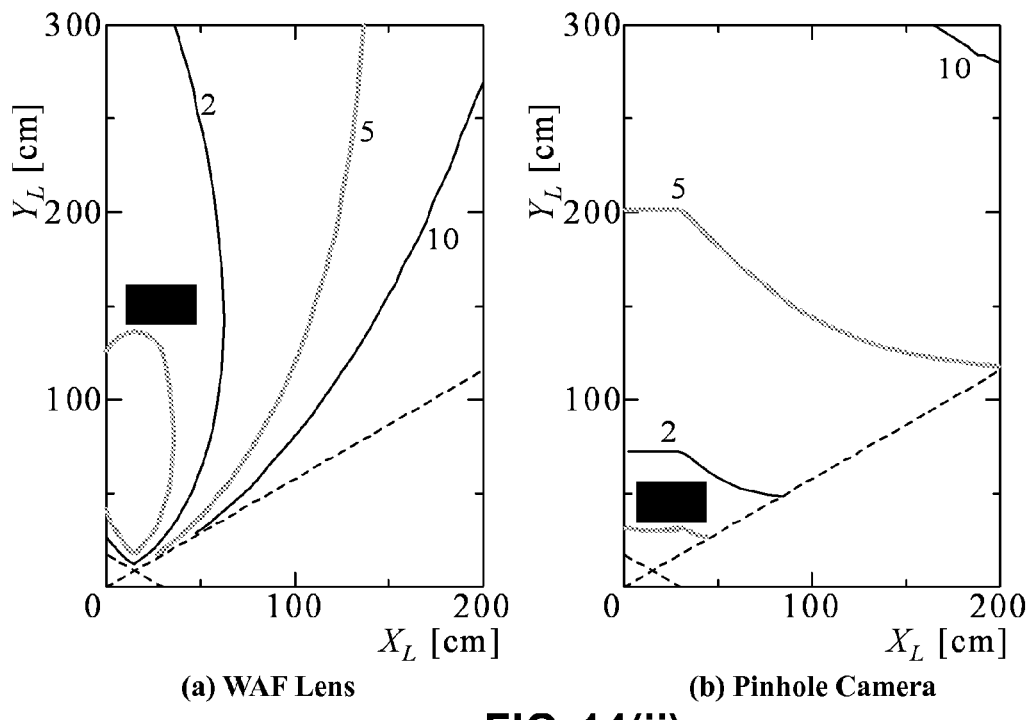
FIG. 14(ii) shows contour lines of depth error.
Figure 15A:
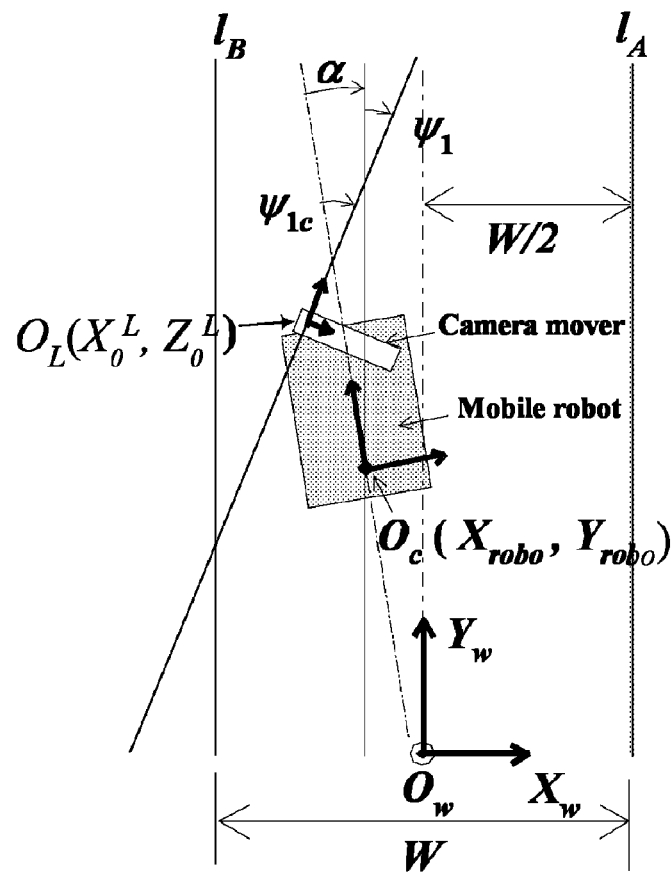
FIG. 15(a) shows parameters of robot's and camera mover's location and orientation.
Figure 15B:
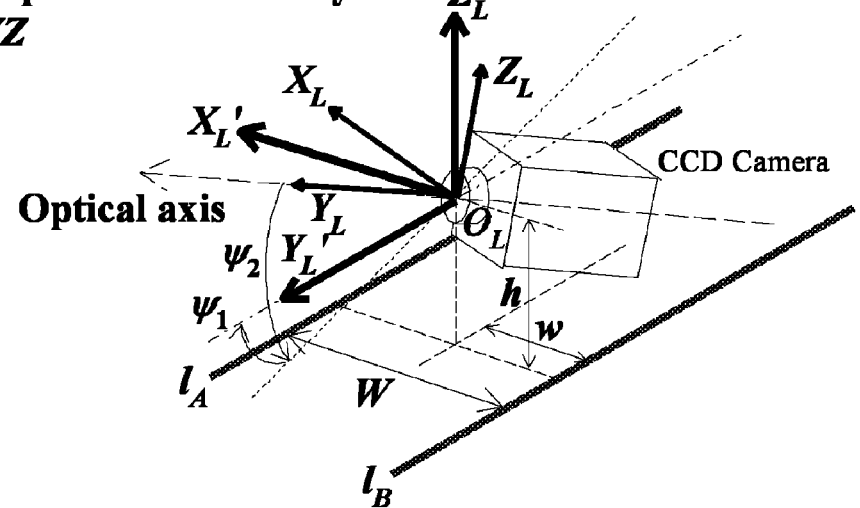
FIG. 15(b) shows a sketch of coordinate system $O_L\text{-}X_L'Y_L'Z_L'$.
Figure 16:
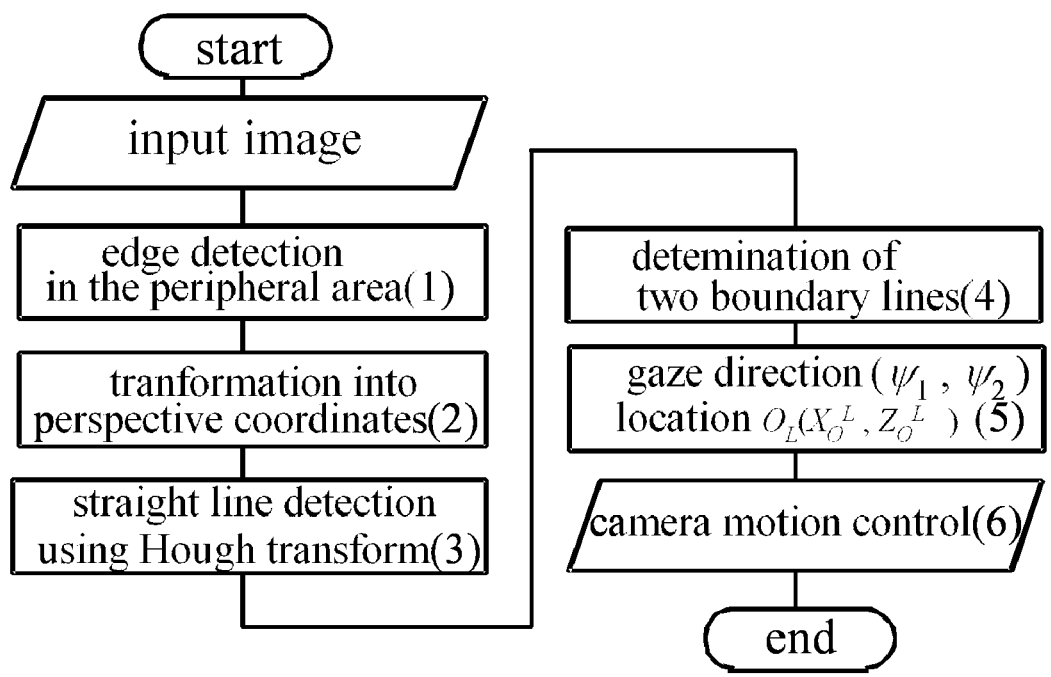
FIG. 16 shows a flowchart of TPL algorithm.
Figure 17:
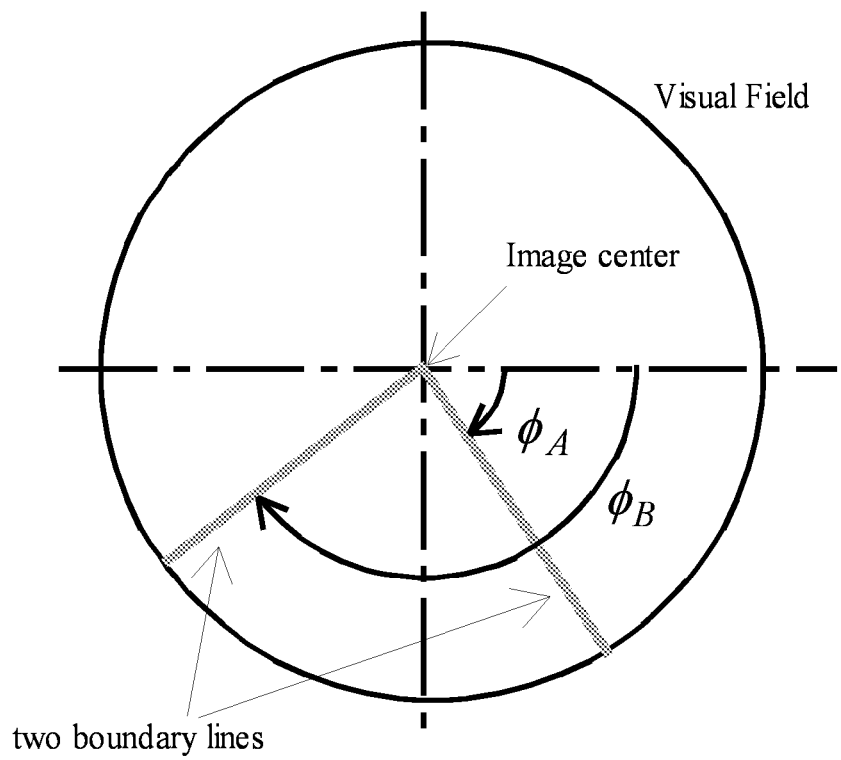
FIG. 17 shows two boundary lines in visual field when camera's view direction is parallel to these lines.
Figure 18:
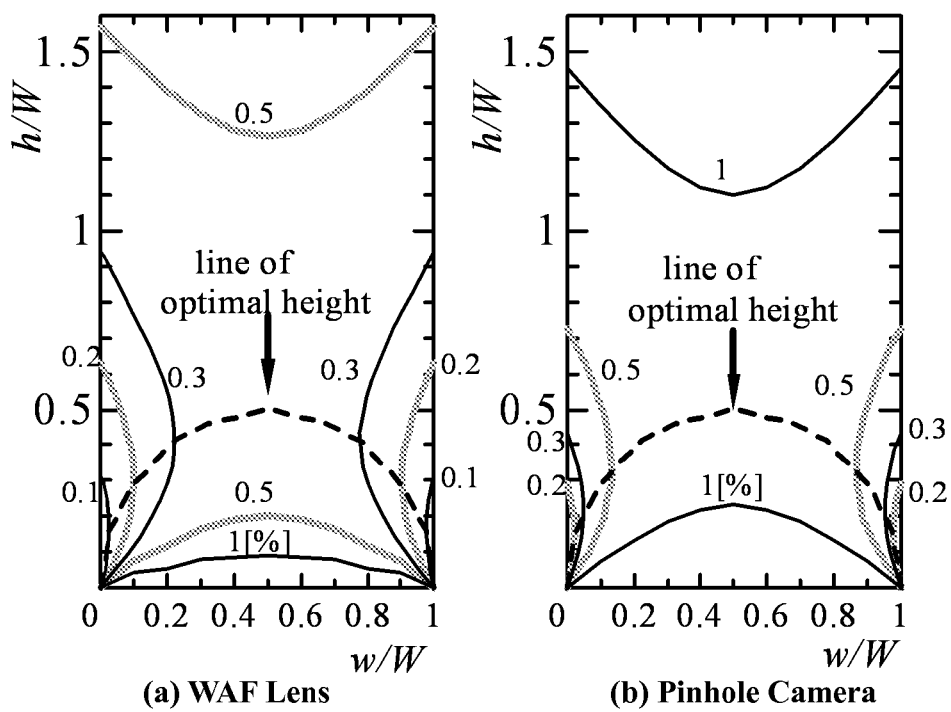
FIG. 18 shows contour graphs of horizontal position error $\Delta w$.
Figure 19:
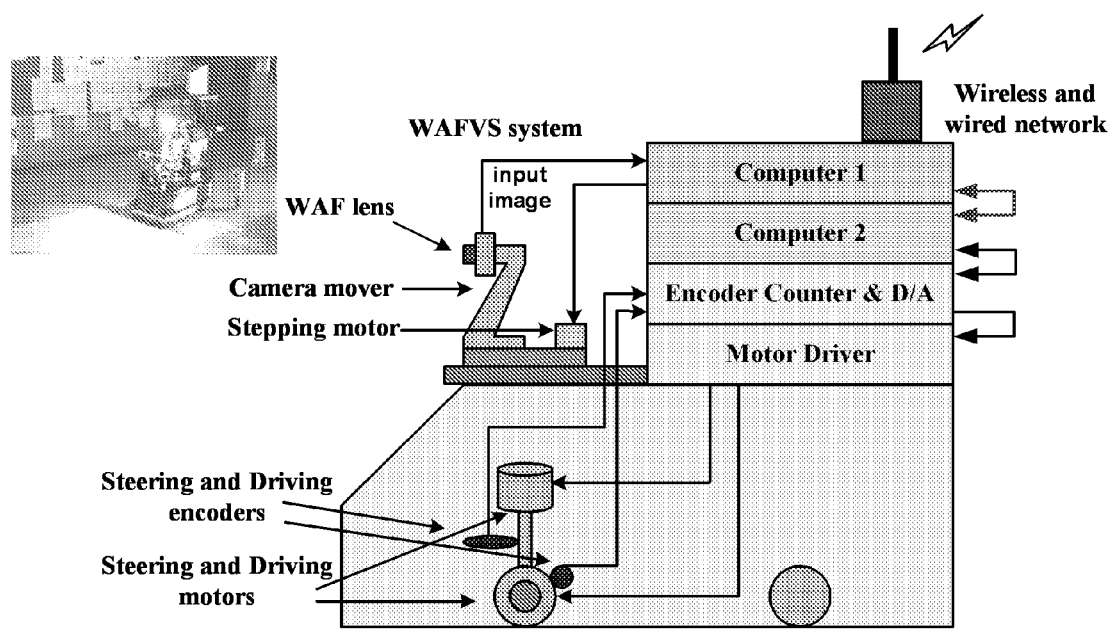
FIG. 19 shows a prior-art WAFVS system and a mobile robot.
Figure 20I:
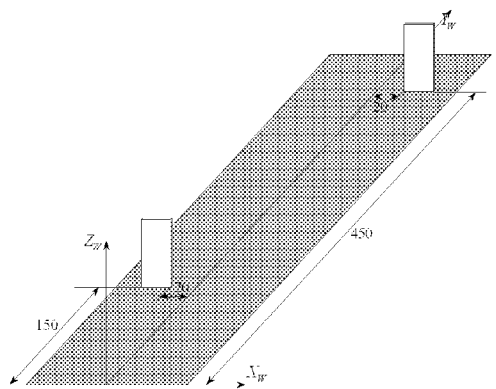
FIG. 20(i) shows experimental environments for obstacle avoidance navigation.
Figure 20:
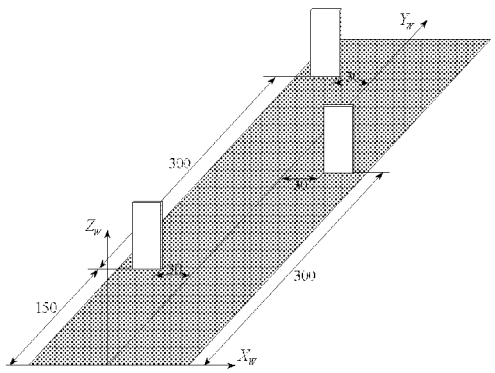
FIG. 20(ii) shows experimental results of prior-art obstacle avoidance navigation.
Figure 20:
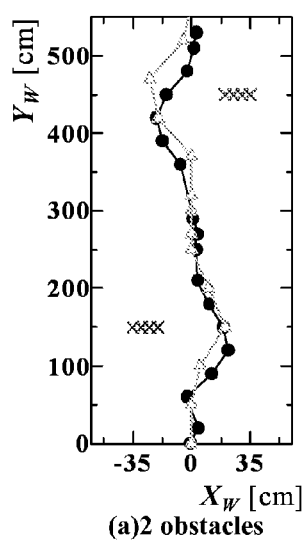
Figure 20:
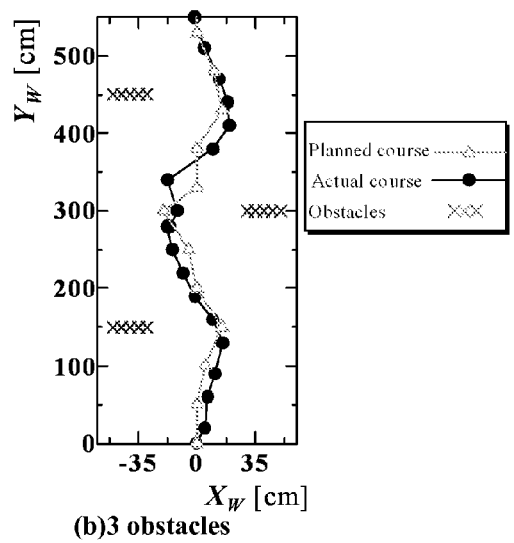
Figure 27:
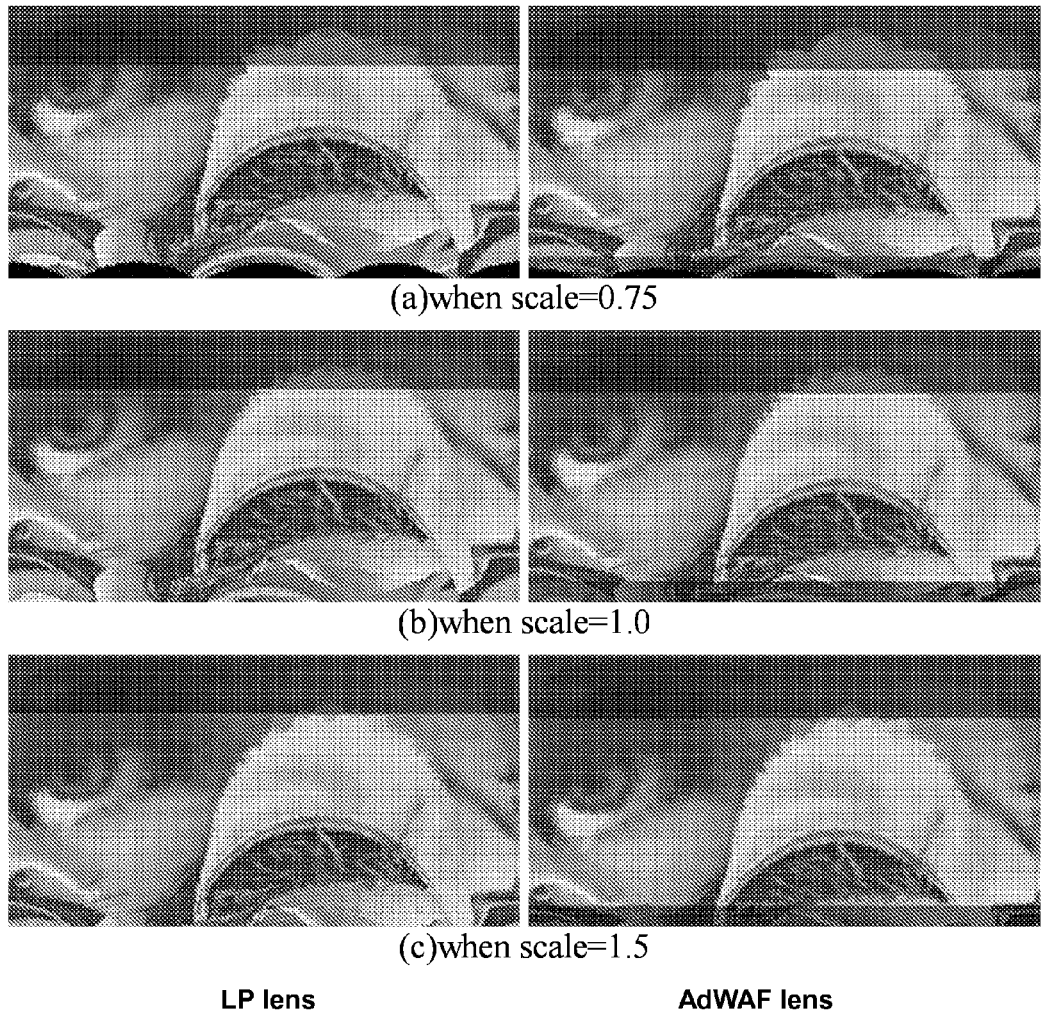
FIG. 27 shows LP images from the LP lens (left) and AdWAF image (right).

Both of the disclosed AdWAF model and the Kuniyoshi's model can acquire LP image with rotation and scale-invariant property. FIGS. 27 and 6 show a comparison of the LP lens (left) and the AdWAF model (right), and a comparison of the LP lens (left) and the K lens (right), respectively, by their polar coordinate images extracted from test images in FIG. 26(a), (b) and (c). Both comparisons are simulated under the same conditions of $\theta_{max}$=π/3, $h_{max}$=1, $h_0$=0.026, $h_1$=0.21, and $h_2$=0.6. A bright part in each image shows the logarithmic area composed of para-fovea and near-periphery. On the other hand, upper and lower dark parts, where brightness of each pixel is reduced by half, show the planar Cartesian area (fovea) and the spherical Cartesian area (periphery). One notes that the disclosed AdWAF model acquires the wider fovea with translation-invariance than the LP lens, in spite of being the periphery (the lower dark part), because the near-periphery reduces the image size of its corresponding part. In this condition, the disclosed AdWAF model acquires the wider fovea and a wider logarithmic area than that acquired by the K lens.

Figure 28:
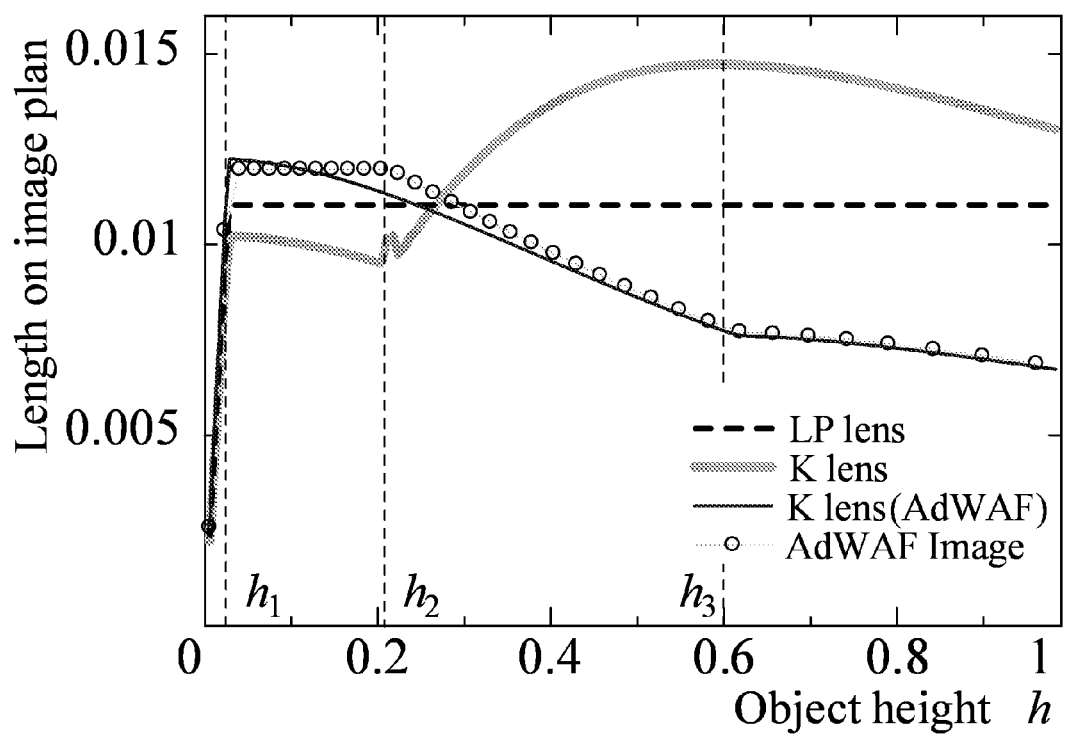
FIG. 28 shows plots for K lens (AdWAF) and AdWAF image.

FIG. 28 shows a length on the image plane to indicate accuracy of scale-invariance in terms of the object height, h, as related to the K lens (AdWAF) and the disclosed AdWAF model's image. This length is a difference between an image height corresponding to each h and another image height corresponding to 95 percent of the h, where $r_{max}$=1. A broken line, a bold solid line and a fine solid line with circle show the LP lens, the K lens and the AdWAF model, respectively. Scale-invariance means that a gradient of each line is continuously zero. One notes that all are not scale-invariant in the fovea (0≦h≦$h_0$), consequently. In para-fovea, the K-lens is not scale-invariant, exactly. A fine solid line shows the simulated K lens drawn by the disclosed AdWAF model under a different condition of $\theta_{max}$=π/3, $h_{max}$=1, $h_0$=0.026, $h_1$=0.026, and $h_2$=0.6. This line changes more smoothly than that of the original K lens, although para-fovea is not scale-invariant. Thus, since the definition of the disclosed AdWAF model is more accurate, the disclosed AdWAF model can describe other WAF vision sensors more flexibly.

The foregoing demonstrates that (a) the disclosed AdWAF model can acquire a higher M.F. in the fovea than the LP lens model, (b) the disclosed AdWAF model can acquire a more accurate scale-invariant area in the para-fovea and can acquire a wider translation-invariant area in the fovea, and (c) the disclosed AdWAF model can describe another WAF lens more flexibly, because the AdWAF model is defined more accurately.

III. Another Embodiment of the AdWAF Model

A. Modeling

Figure 29:
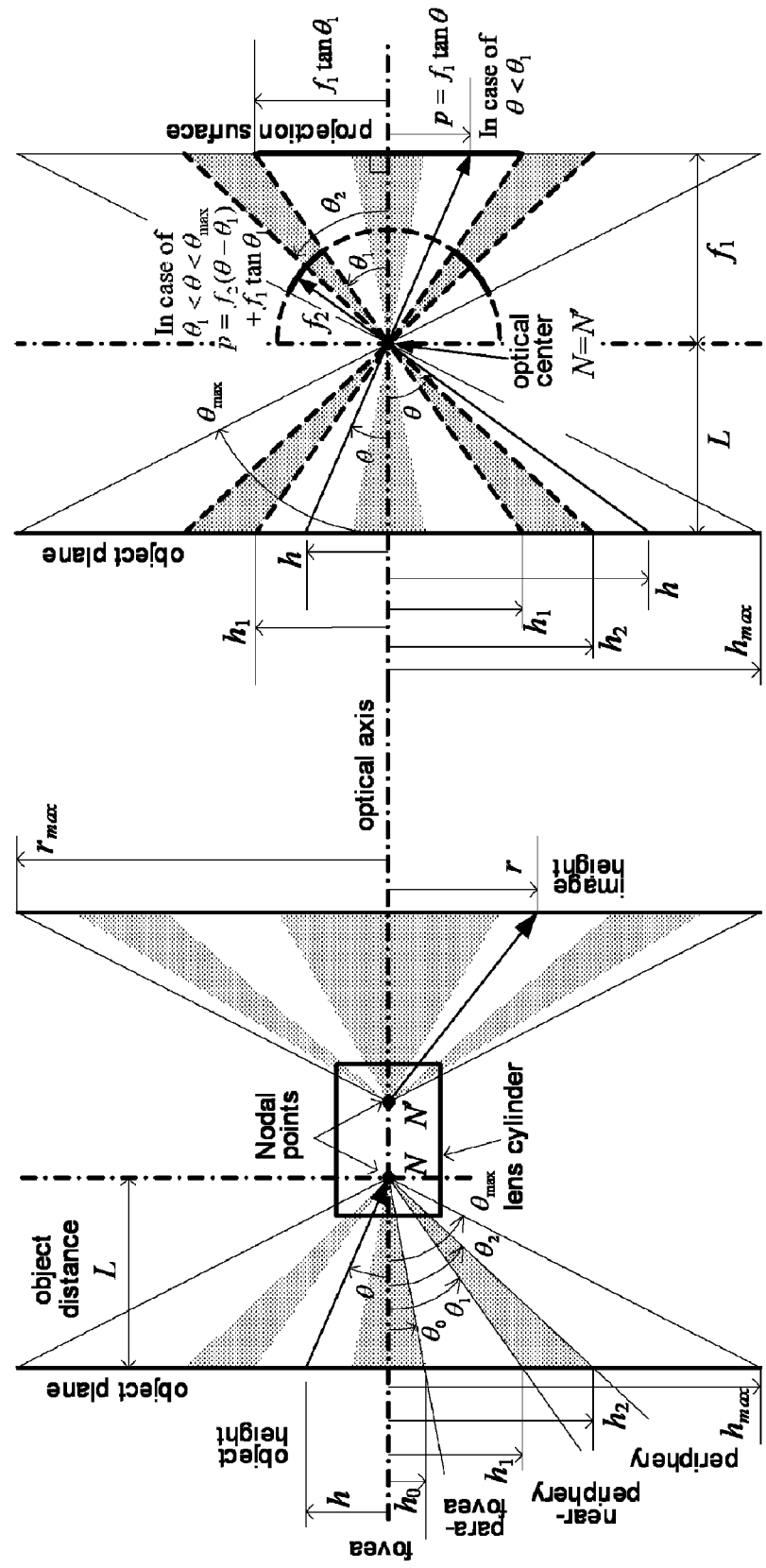
FIG. 29 shows another embodiment of a camera model of the present disclosure based on a combination of planar projection and spherical projection.

In order to make a better all-purpose use of the WAF image, a geometrical model, namely, another embodiment (AdWAF) model is disclosed. FIG. 29 shows another embodiment of a camera model that combines planar projection and spherical projection. The former is a perspective projection, that is, linear to tangent of incident angle θ to the lens optical center, and the latter is linear to the θ. The projection height, p, of this camera model is represented as below:

if $0 \leq \theta \leq \theta_1$, $$p = f_1 \tan \theta, \quad (36)$$

else if $\theta_1 \leq \theta \leq \theta_{max}$, $$p = f_2(\theta - \theta_1) + f_1 \tan \theta_1, \quad (37)$$

where $f_1$ and $f_2$ are focal lengths to the projection plane and the spherical projection surface, respectively.

The disclosed AdWAF model is denoted by the following equations, combining both planar projection by (36) and spherical projection by (37) with both linear coordinates and logarithmic coordinates.

if $0 \leq \theta \leq \theta_0$, $$r = r_{max} c_0 f_1 \tan \theta, \quad (38)$$

else if $\theta_0 \leq \theta \leq \theta_1$, $$r = r_{max}\{c_1 \log_a(f_1 \tan \theta) + d_1\}, \quad (39)$$

else if $\theta_1 \leq \theta \leq \theta_2$, $$r = r_{max}\{c_2 \log_b(f_2\theta) + d_2\}, \tag{40}$$

else if $\theta_2 \leq \theta \leq \theta_{max}$, $$r = r_{max}(c_3 f_2 \theta + d_3), \tag{41}$$

where r is image height versus the $\theta$, $r_{max}$ is the maximum image height when $\theta = \theta_{max}$, $c_i$ (i=0, 1, 2, 3) is a scale modification factor for adjusting image height partly in each section of $\theta$ and $d_i$ (i=0, 1, 2, 3) is $$d_1 = c_0 f_1 \tan\theta_0 - c_1 \log_a(f_1 \tan\theta_0), \tag{42}$$

$$d_2 = c_1 \log_a(f_1 \tan\theta_1) - c_2 \log_b(f_2\theta_1) + d_1, \tag{43}$$

$$d_3 = c_2 \log_b(f_2\theta_2) - c_3 f_2 \theta_2 + d_2. \tag{44}$$

Because Equs. (38) to (41) are continuous at each boundary, if these derivatives are also continuous when $c_0 = c_1 = c_2 = c_3 = 1$, $$f_1 = \frac{1}{\tan\theta_0} \bigg/ \left\{ 1 + \log\frac{\tan\theta_1}{\tan\theta_0} + \frac{\theta_1}{\cos\theta_1 \sin\theta_1} \left( \frac{\theta_{max} - \theta_2}{\theta_2} + \log\frac{\theta_2}{\theta_1} \right) \right\}, \tag{45}$$

$$f_2 = \frac{f_1 \tan\theta_0}{\cos\theta_1 \sin\theta_1} \cdot \frac{\theta_1}{\theta_2}, \tag{46}$$

$$a = \exp\left(\frac{1}{f_1 \tan\theta_0}\right), \tag{47}$$

$$b = \exp\left(\frac{1}{f_2 \theta_2}\right). \tag{48}$$

Figure 30:
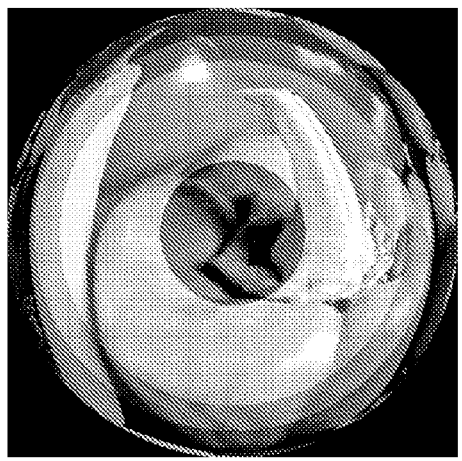
FIG. 30 shows a comparison of AdWAF image and linear-coordinate image.
Figure 30:
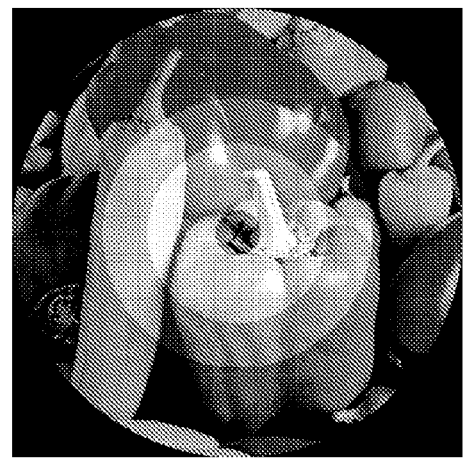

The disclosed AdWAF model divides the field of view into four areas, that is, fovea ($0 \leq \theta \leq \theta_0$), para-fovea ($\theta_0 \leq \theta \leq \theta_1$), near-periphery ($\theta_1 \leq \theta \leq \theta_2$), and periphery ($\theta_2 \leq \theta \leq \theta_{max}$). The fovea is planar and its image height is linear to the object height h. On the other hand, the periphery is spherical and its image height is linear to the incident angle $\theta$. FIG. 30 simulates an image by the disclosed AdWAF model and a Cartesian linear-coordinate image by pinhole camera (PHC) lens model, under condition that the boundaries of FOV, $\theta_0$, $\theta_1$, and $\theta_2$, are 9.826 [°], 19.107 [°], and 34.715 [°], respectively. The intensity is changed in order to see each boundary easily.

Figure 31:
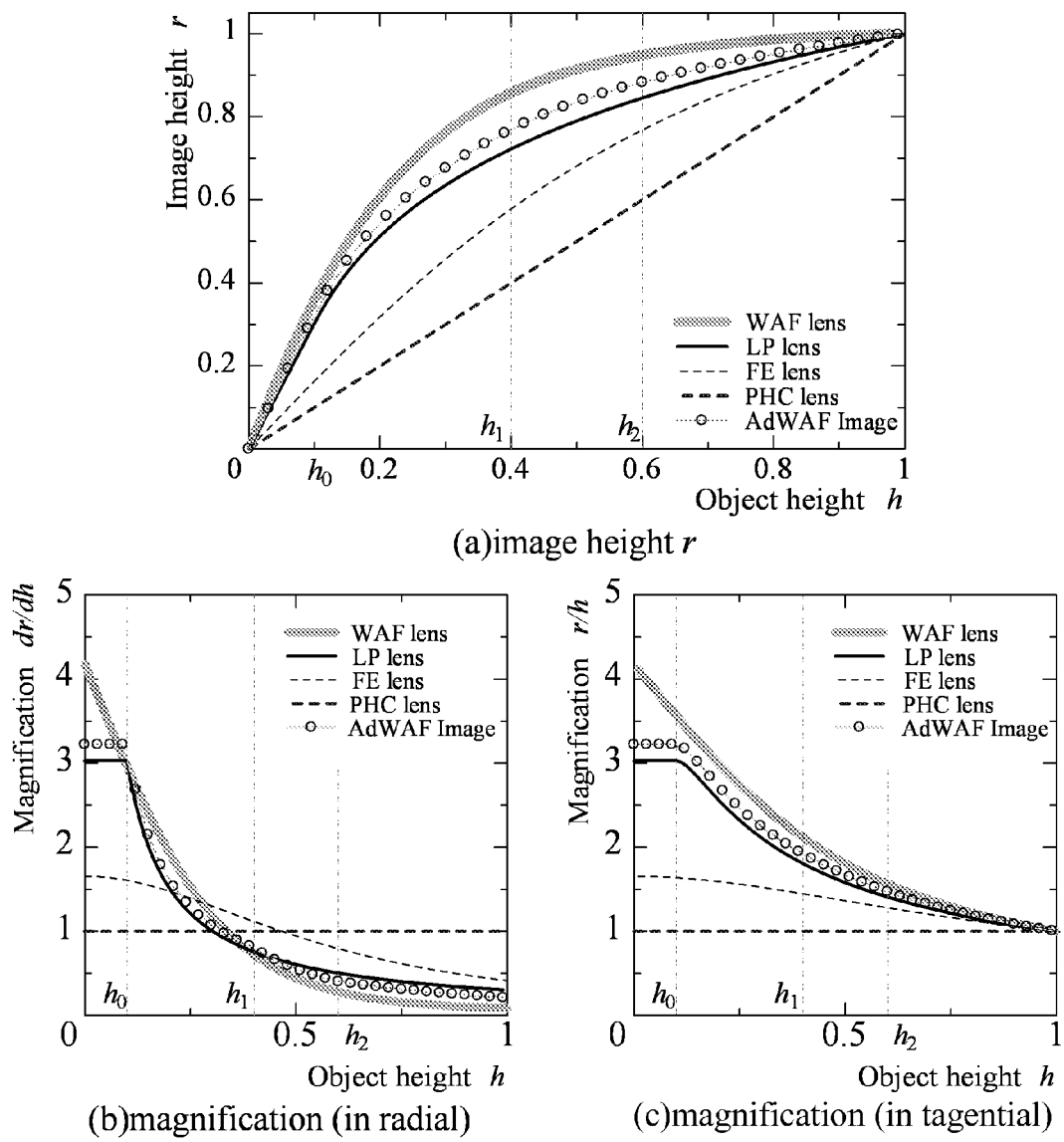
FIG. 31 shows plots for an AdWAF image.

FIG. 31 shows the image height r, M.F. dr/dh and r/h in the radial and tangential directions of the disclosed AdWAF model for an AdWAF image plot, versus the object height h. The $h_{max}$ and $r_{max}$ are normalized to 1 (when $\theta_{max} = \pi/3$) in order to compare other types of lens, that is, a log-polar (LP) lens, a fish eye (FE) lens, the PHC lens and the WAF lens. In this simulation, the boundaries of FOV, that is, $h_0$, $h_1$ and $h_2$, are 0.1 ($\theta_0 = 9.826$ [°]), 0.4 ($\theta_1 = 19.107$ [°]), and 0.6 ($\theta_2 = 34.715$ [°]), respectively.

A bold solid line shows the actual WAF lens. The distribution of its image height and M.F. is characterized by the design concept of the WAF lens, that is, acquiring wide FOV and high resolution locally in the central FOV. Its M.F. in the radial direction is much higher than that of the PHC lens (a bold broken line) and the FE lens (a fine broken line) in small incident angles, on the other hand, lower in large incident angles. FIG. 31 shows that the disclosed AdWAF model (a fine solid line with circle) can acquire a higher M.F. in the fovea $0 \leq h \leq h_0$ (that is, $0 \leq \theta \leq \theta_0$) than the LP lens (a solid line), in the case of the same FOV. The scale modification factor $c_i$ is applicable for adjusting the image height of the disclosed AdWAF image in order to make its M.F. in the fovea to be equal to that of the LP lens. If $c_0 = c_1 = c_2 = c_3 = 0.93$, the modified M.F. is almost equal to that of the LP lens in the fovea in the case of FIG. 31(b). Stated differently, this means that the disclosed AdWAF model may reduce the number of pixels by about 13.5 percent in the whole of image comparing to that by the LP lens.

B. Implementation

Figure 32:
FIG. 32 shows a target image and simulated images of the another AdWAF model.
Figure 32:

FIG. 32 simulates an image by the disclosed AdWAF model (AdWAF image), by the whole view, under conditions of $r_{max} = 64$ [pixel], $\theta_{max} = \pi/3$, $\theta_0 = 9.826$ [°], $\theta_1 = 19.107$ [°] and $\theta_2 = 34.715$ [°]. Each image is simulated from a target image of 512×512 [pixels] (FIG. 32(a)). A comparison with existing lenses has been done elsewhere, such as FIG. 3. The AdWAF image (FIG. 32(f)) has a higher resolution in its central area than the LP lens image (FIG. 32(c)). On the other hand, the resolution of its peripheral area is between those of the WAF lens (FIG. 32(b)) and the LP lens. It should be remarked that all of these simulated images can be represented using the AdWAF model.

Figure 33:
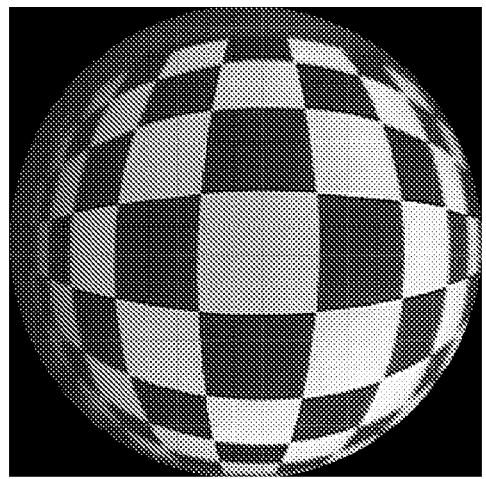
FIG. 33 shows an AdWAF image extracted from an actual image.
Figure 33:
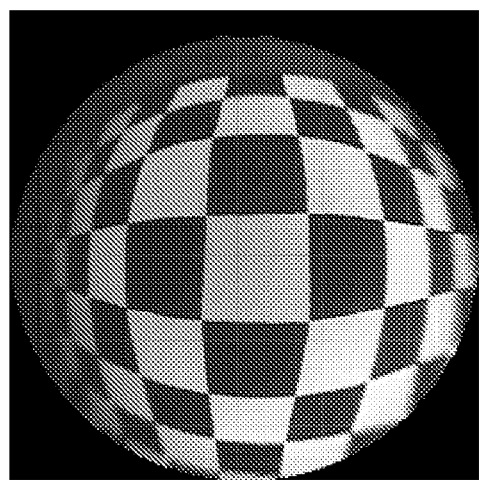
Figure 33:
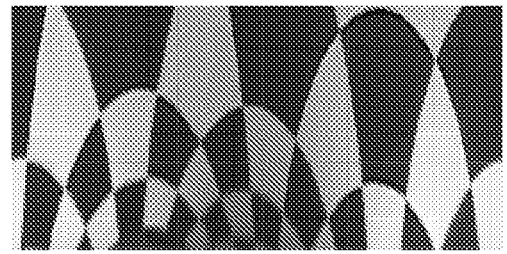
Figure 33:
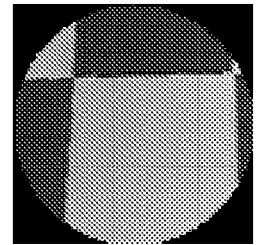

FIG. 33 shows an AdWAF image, actually extracted from a WAF lens under the same conditions as those of the above simulation. FIG. 33(a), (b), (c) and (d) are an actual input image by the WAF lens, the extracted AdWAF image by the whole view, the para-fovea image, that is, a log-polar image (with planar logarithmic coordinates) by (39), and the fovea image (with planar linear coordinates) by (38), respectively. In addition to wide FOV, the rotation- and scale-invariant property of the para-fovea image, and translation-invariant property of the fovea image are suitable for an all-purpose use.

C. Examination (i). Representing Other Foveation Models

Figure 34A:
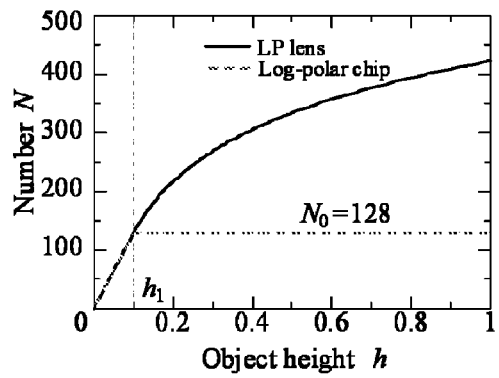
FIG. 34A shows foveation models of LP lens log-polar chip, for example.
Figure 34A:
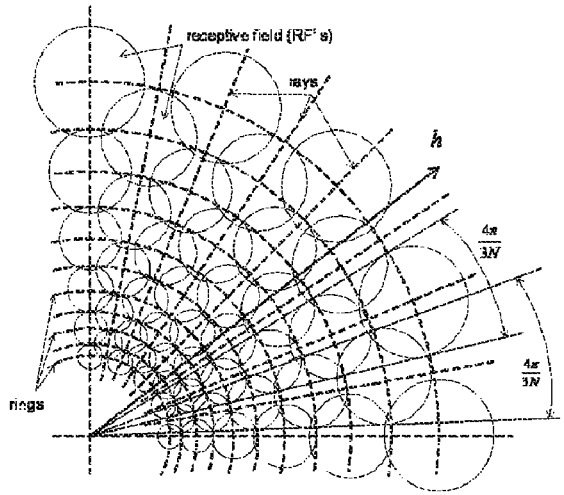
Figure 34A:
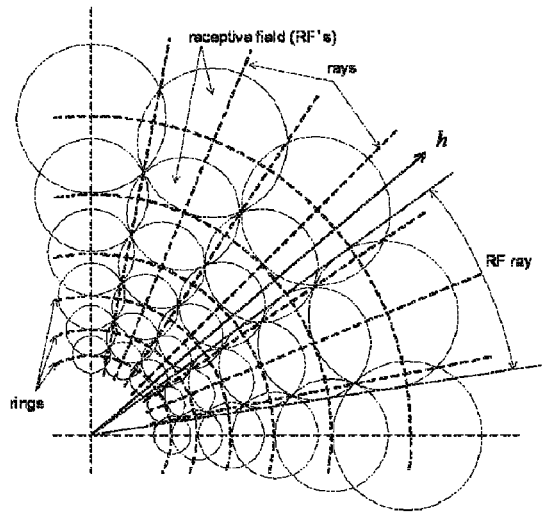

Some foveation models used for the existing log-polar chip and vision system are represented by the disclosed AdWAF model when $\theta_1 = \theta_2 = \theta_{max}$ and $c_2 = c_3 = 0$. The FOV of such models is divided into fovea and "periphery" similarly to the LP lens. The para-fovea of the disclosed AdWAF model denotes a log-polar grid in "periphery," assuming that the PHC lens is used. The log-polar grid is composed of rings and rays for position of receptive fields (RF's) (FIG. 34A). On the other hand, the fovea has a uniform size of the RF's. In addition, this size is equal to that of the first ring in 'periphery', in order to avoid discontinuity at the fovea 'periphery' boundary. A radius of each ring is calculated as the normalized object height h using the disclosed AdWAF model as follows:

if $0 \leq \theta \leq \theta_0$ (fovea), $$h = \frac{r}{r_{max} c_0 f_1 \tan\theta_{max}}, \tag{49}$$

else if $\theta_0 \leq \theta \leq \theta_{max}$ ("periphery"), $$h = \frac{\tan\theta_0}{\tan\theta_{max}} a^{\frac{r - r_0}{r_{max} c_1}}, \tag{50}$$

where $r_0$ is a radius of the fovea\"periphery" boundary, that is, $$r_0 = r_{max} c_0 f_1 \tan\theta_0. \tag{51}$$

With respect to the log-polar sensor, one of the differences between the lens and the solid-state chip is the number, N, of the RF's along the ring. Here, the case of the lens assumes that each photosensitive element is equivalent with the RF. The number N of the LP lens increases, as the h gets larger (in population to the r), while the log-polar chip has a constant number $N_0$ in "periphery." FIG. 34A(a) compares the N of both cases versus the h, when $N_0 = 128$, $\theta_0 = 9.826$ [°], $\theta_{max} = 60.0$ [°] and $c_0 = c_1 = 1$, in addition to that, when the number of the RF's is equal in the fovea.

Comparing Sandini's model (FIG. 34A(b)) and Bolduc's model (FIG. 34A(c)), the size of RF's changes differently between these two models in a hatched area of the FOV (that is, "periphery"), although the $N_0$, $\theta_0$ and $\theta_{max}$ are common. This means a ring number is not equal to the image height r, necessarily, because each RF could be composed of multiple photosensitive elements. The disclosed AdWAF model represents different arrangement of the log-polar grid by the scale modification factors $c_0$ and $c_1$. The $c_0$ modifies the $r_0$ (that is, modifies the number of the RF's in the fovea). The $c_1$ adjusts logarithmic change of a radius of the ring. In this case, the r in Equs. (49) and (50) can be regarded as the ring number. Thus, the $c_0$ and $c_1$ fit both models into the disclosed AdWAF model even with the same $N_0$, $\theta_0$ and $\theta_{max}$.

The Kuniyoshi lens (K lens) model has a planar linear part in $0 \leq \theta \leq \theta_0$, a spherical logarithmic part in $\theta_0 \leq \theta \leq \theta_1$ and a spherical linear part $\theta_1 \leq \theta \leq \theta_{max}$, but it does not have the planar logarithmic part (para-fovea by Equ. (39)). Thus, the disclosed AdWAF model represents the K lens model, in condition of $f_{k1} = f_1$ and $f_{k2} = f_2$, as follows:

K Lens Model:

$$\text{if } 0 \leq \theta \leq \theta_0, \tag{52}$$
$$r = r_{max} f_{k1} \tan\theta,$$
$$\text{else if } \theta_0 \leq \theta \leq \theta_1,$$

$$r = r_{max}\{\log_{b_k}(f_{k2}\theta) - p\}, \tag{53}$$

$$\text{else if } \theta_1 \leq \theta \leq \theta_{max},$$

$$r = r_{max}(f_{k2}\theta + q), \tag{54}$$

where $$b_k = \exp\left\{\frac{1}{1 - f_{k1}\tan\theta_0}\left(\frac{\theta_{max} - \theta_1}{\theta_1} + \log\frac{\theta_1}{\theta_0}\right)\right\}, \tag{55}$$

$$p = \log_{b_k}(f_{k2}\tan\theta_0) - f_{k1}\tan\theta_0, \tag{56}$$

$$q = -f_{k2}\theta_1 + \log_{b_k}\frac{\theta_1}{\theta_0} + f_{k1}\tan\theta_0. \tag{57}$$

Figure 34B:
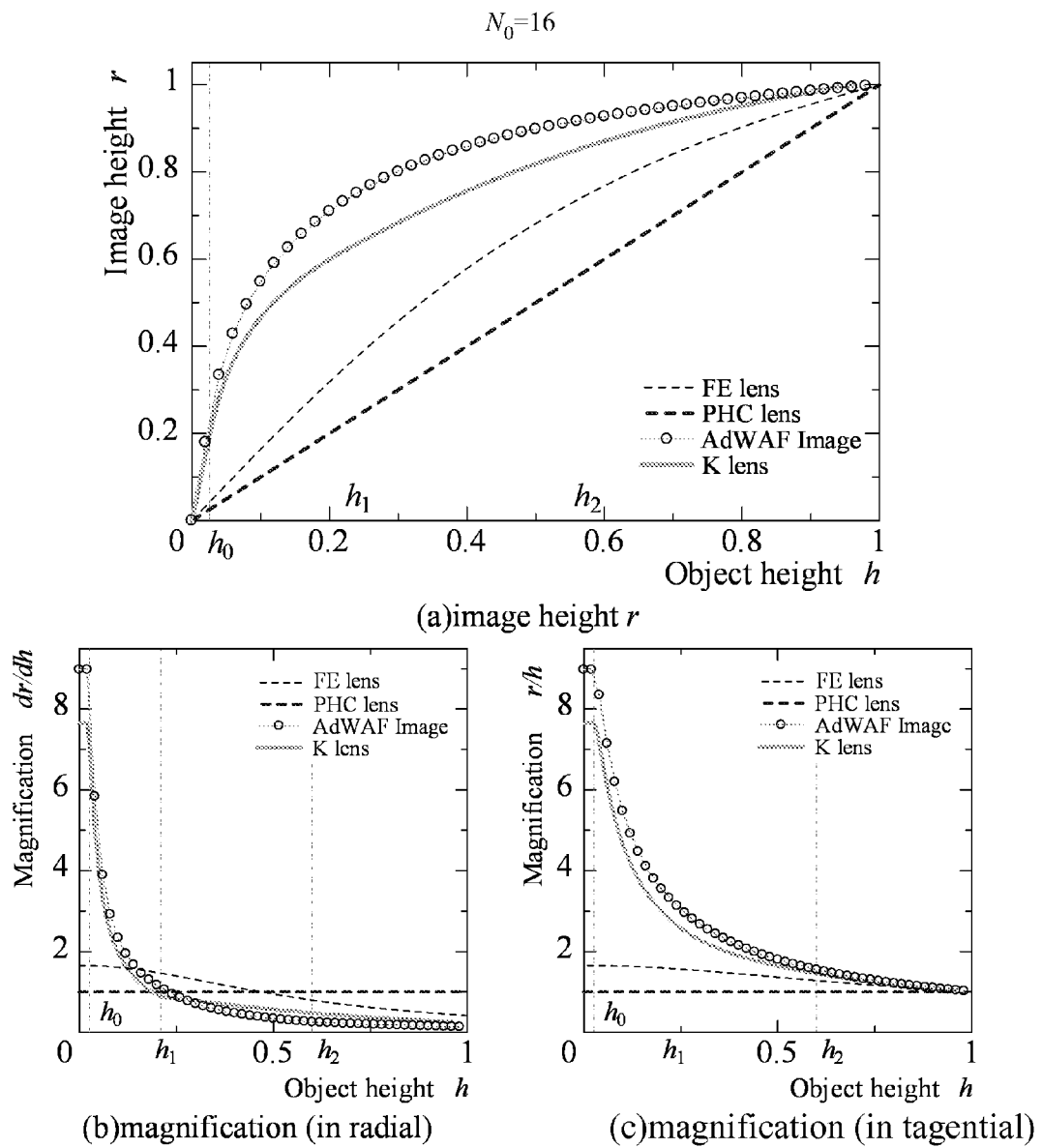
FIG. 34B shows plots for an AdWAF image in terms of object height.

FIG. 34B shows a comparison of the disclosed AdWAF model (a fine solid line with circle) and the K lens (a bold solid line), in condition of $r_{max}=1$, $\theta_{max}=60.0$ [°], $\theta_0=2.584$ [°], $\theta_1=20.0$ [°] and $\theta_2=34.715$ [°], related to the AdWAF Image plot (these values are determined from specification of the actual K lens). The FE lens (a fine broken line) and the PHC lens (a bold broken line) are also compared with them. This condition of boundaries indicates the AdWAF image gives a higher M.F. in $0 \leq \theta \leq \theta_0$ than the K lens, by the same FOV. On the other hand, when it has the same M.F. in the fovea ($0 \leq \theta \leq \theta_0$) as the K lens, the $r_{max}$ is 0.85. This means that the AdWAF image reduces the number of pixels by about 28 percent.

(ii). Comparison of AdWAF Image, LP Lens and K Lens

Figure 35I:
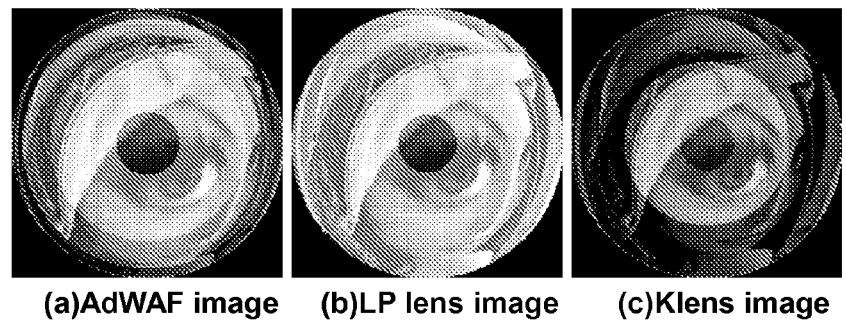
FIG. 35(i) shows an AdWAF image, an LP lens image and a K lens image.

FIG. 35(i) compares the AdWAF image, the LP lens image and the K lens image, simulated under a condition of $\theta_{max}=60.0$ [°], $\theta_0=2.584$ [°], $\theta_1=20.0$ [°] and $\theta_2=34.715$ [°], by changing intensity. The FOV is divided into four areas, that is, fovea (the central dark part), para-fovea (the brightest part), near-periphery (the second brightest part) and periphery (outer dark part). It is noted that the LP lens image has only fovea and para-fovea, and that the K lens image does not have para-fovea. The AdWAF image shows a higher M.F. than the K lens image in the fovea.

Figure 35:
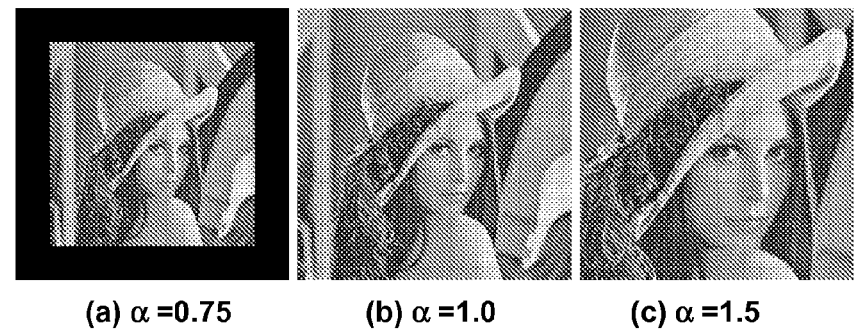
FIG. 35(ii) shows three target images with different scales ($\alpha=0.75$, 1 and 1.5).

FIG. 35(ii) shows three target images with different scales ($\alpha=0.75$, 1 and 1.5). FIG. 35(iii) compares polar images of the AdWAF image (left), the LP lens image (middle) and the K lens image (right), in each scale (under the same condition as in FIG. 35(i)). It is noted that the polar image of the para-fovea has a translation-invariant property in the radial and tangential directions, that is, this part has rotation- and scale-invariant (RS-invariant) property, when the r is linear to the object height h. On the other hand, the near-periphery is RS-invariant when the r is linear to the incident angle $\theta$. These two types of RS-invariant property give the AdWAF image the following advantages:

1) The para-fovea is suitable for matching images with different scale.
2) The near-periphery reduces influence by rotation of the object plane (that is, this causes skew).

That is, these advantages indicate that the disclosed AdWAF model matches different-scaled patterns accurately in wider incident angles, and that it is more robust to the camera rotation.

Figure 36:
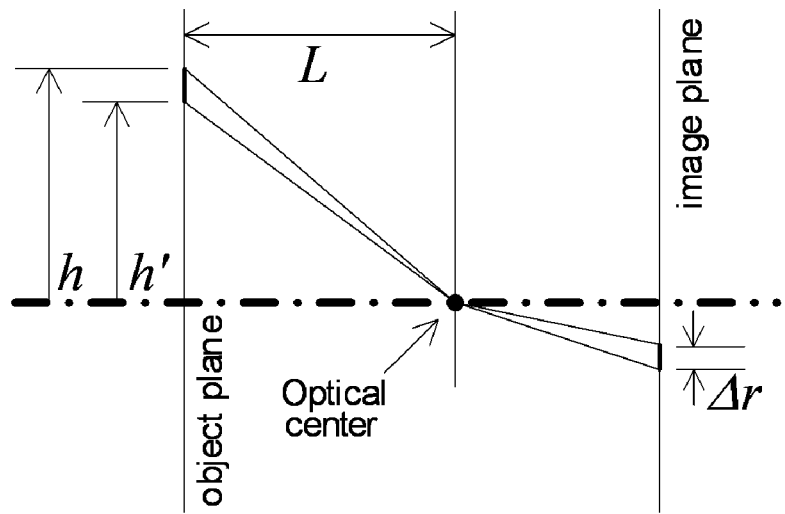
FIG. 36 shows a scale-invariant property of an AdWAF image, an LP lens, and a K lens.
Figure 36:
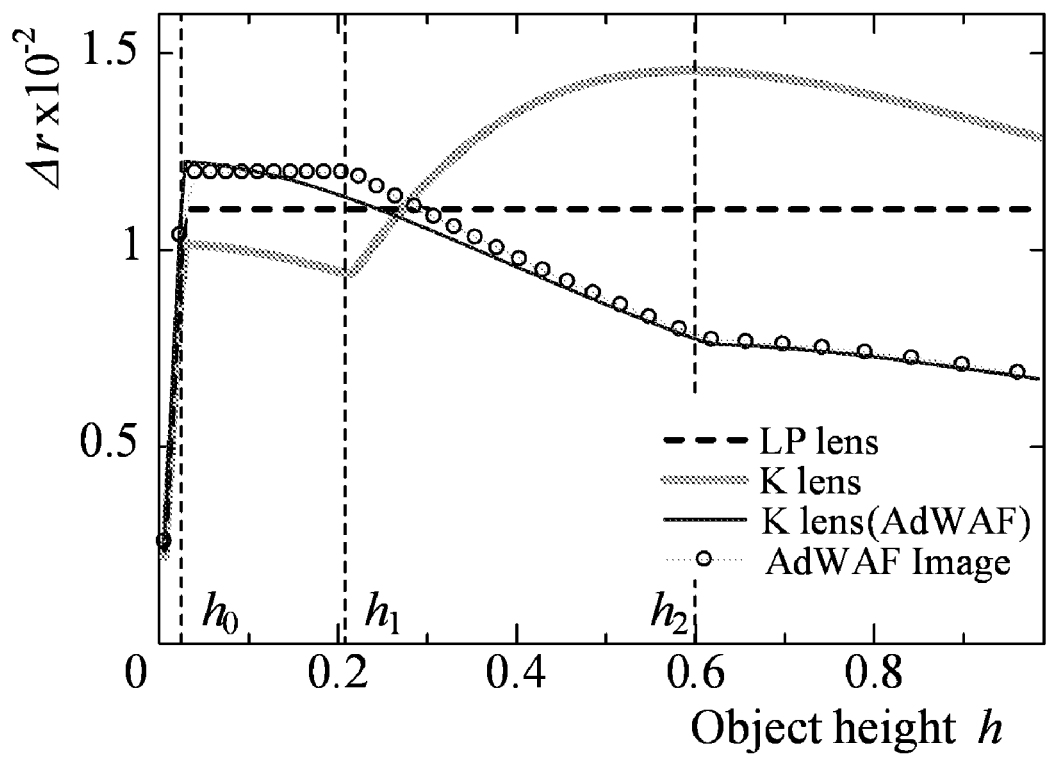

In order to estimate scale-invariant property, a length $\Delta r$ on the image plane is calculated from the object height h and its 95-percent height h' (as in FIG. 36(a)). FIG. 36(b) shows the $\Delta r$ versus the h, in condition of $r_{max}=1$, $\theta_{max}=60.0$ [°], $\theta_0=2.584$ [°], $\theta_1=20.0$ [°] and $\theta_2=34.715$ [°]. A fine solid line with circle, a broken line and a bold solid line show the disclosed AdWAF model, the LP lens and the K lens, respectively. If a gradient of these lines is constantly zero, a corresponding part (that is, a planar logarithmic part) is scale-invariant to the planar projection of the object plane. Thus, the images by the LP lens and the disclosed AdWAF model are scale-invariant in $\theta_0 \leq \theta \leq \theta_{max}$ and in $\theta_0 \leq \theta \leq \theta_1$, respectively. The K lens image is not scale-invariant exactly in this view, that is, the $\Delta r$ has 7.6-percent error at most in $\theta_0 \leq \theta \leq \theta_1$ (a spherical logarithmic part of the K lens).

In addition, the boundary $\theta_1=20.0$ [°] ($h_1=0.21$) of the actual K lens curve is not suitable for image matching, especially in neighborhood of the boundary $\theta_1$. FIG. 36(b) compares the actual curve and the simulated K lens curve (a fine solid line without circle), based on the disclosed AdWAF model, in condition of $\theta_{max}=60.0$ [°], $\theta_0=2.584$ [°] and $\theta_1=34.715$ [°].

Figure 37:
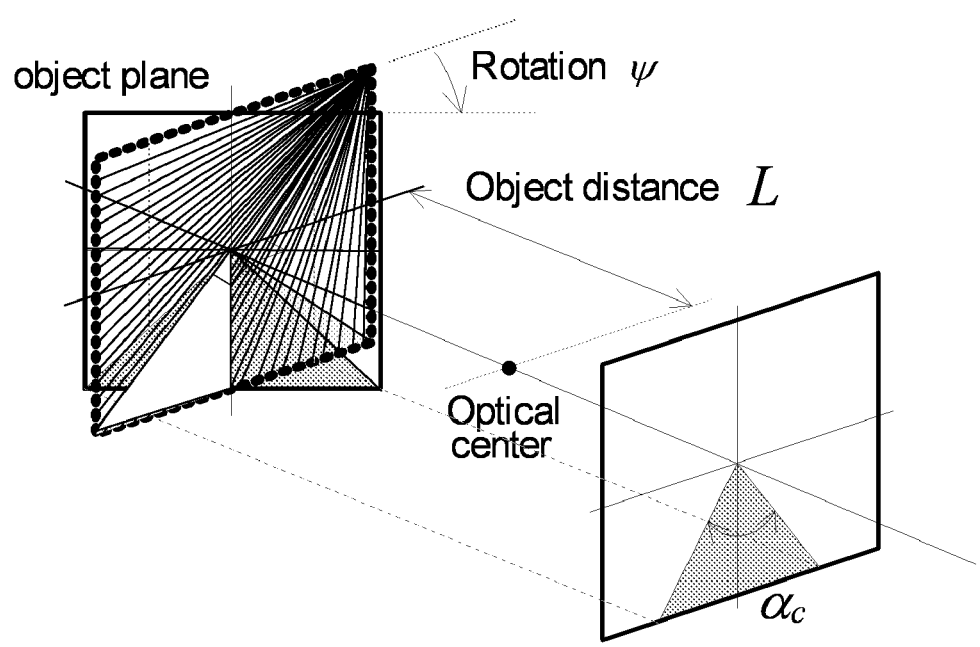
FIG. 37 shows an influence of skew by an AdWAF image and LP lens.
Figure 37:
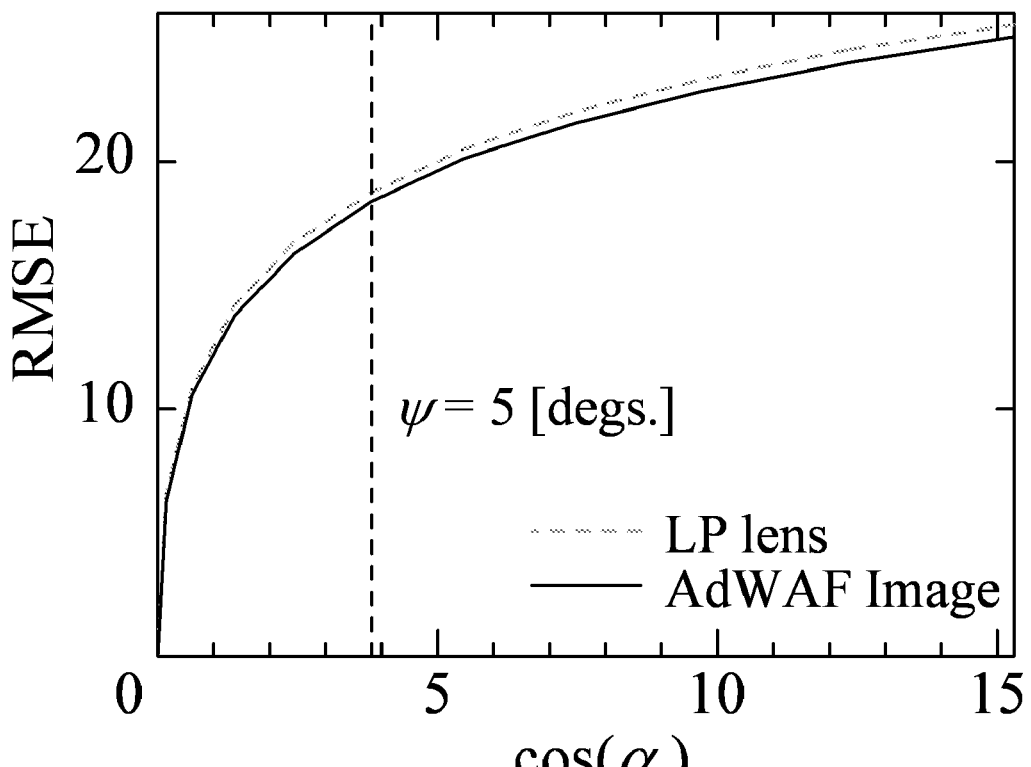

Rotation of the object plane causes skew. In order to test its influence, cosine of a skew coefficient $a_c$ is defined. FIG. 37(a) shows a sketch from rotation $\psi$ to the $\alpha_c$.

$$\cos(\alpha_c) = \frac{\sin^2\psi}{1 + \cos^2\psi}. \tag{58}$$

If the $\psi$ is zero, the optical axis is perpendicular to the object plane, thus, $\alpha_c=\pi/2$ ($\cos(\alpha_c)=0$). FIG. 37(b) compares the disclosed AdWAF model and the LP lens in terms of root mean square error (RMSE), calculated from a part ($\theta_0 \leq \theta \leq \theta_2$) of each polar image, using the case of $\psi=0$ as a model. The value of $\cos(\alpha_c)$ from 0 to $15.3 \times 10^{-3}$ corresponds to the $\psi$ from 0 to 10 [°]. The disclosed AdWAF model has a smaller RMSE than the LP lens. This means it is more robust to the skew than the LP lens, because the spherical logarithmic part of $\theta_1 \leq \theta \leq \theta_2$ gives us less image deformation.

Figure 38:
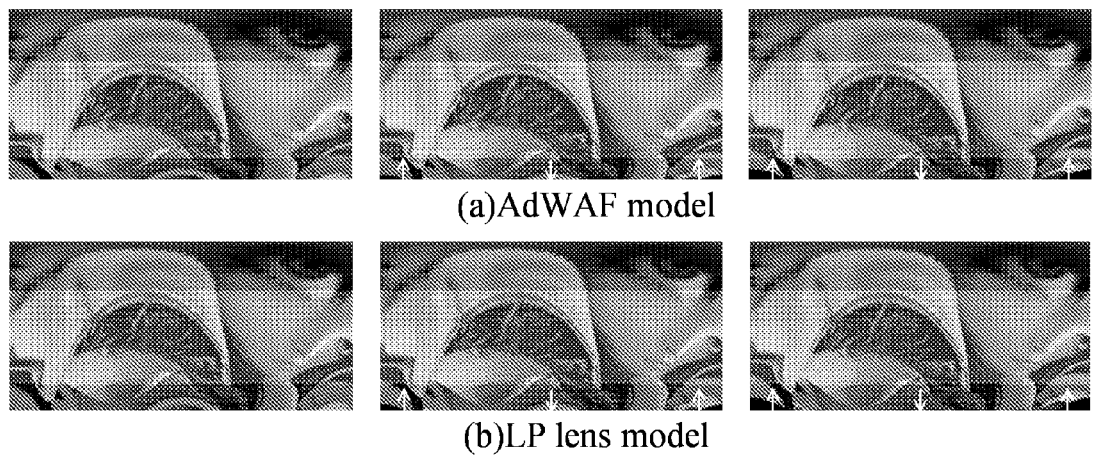
FIG. 38 shows Polar images of AdWAF image and LP lens model when $\psi=0$, 5 and 10 [°] from the left.

FIG. 38 compares the disclosed AdWAF model and the LP lens model by their polar images when $\psi=0$, 5 and 10 [°]. The polar image deforms toward the directions that white arrows show, as the $\psi$ gets larger. FIG. 38 also shows the deformation by the disclosed AdWAF model is smaller than that by the LP lens model.

Figure 39:
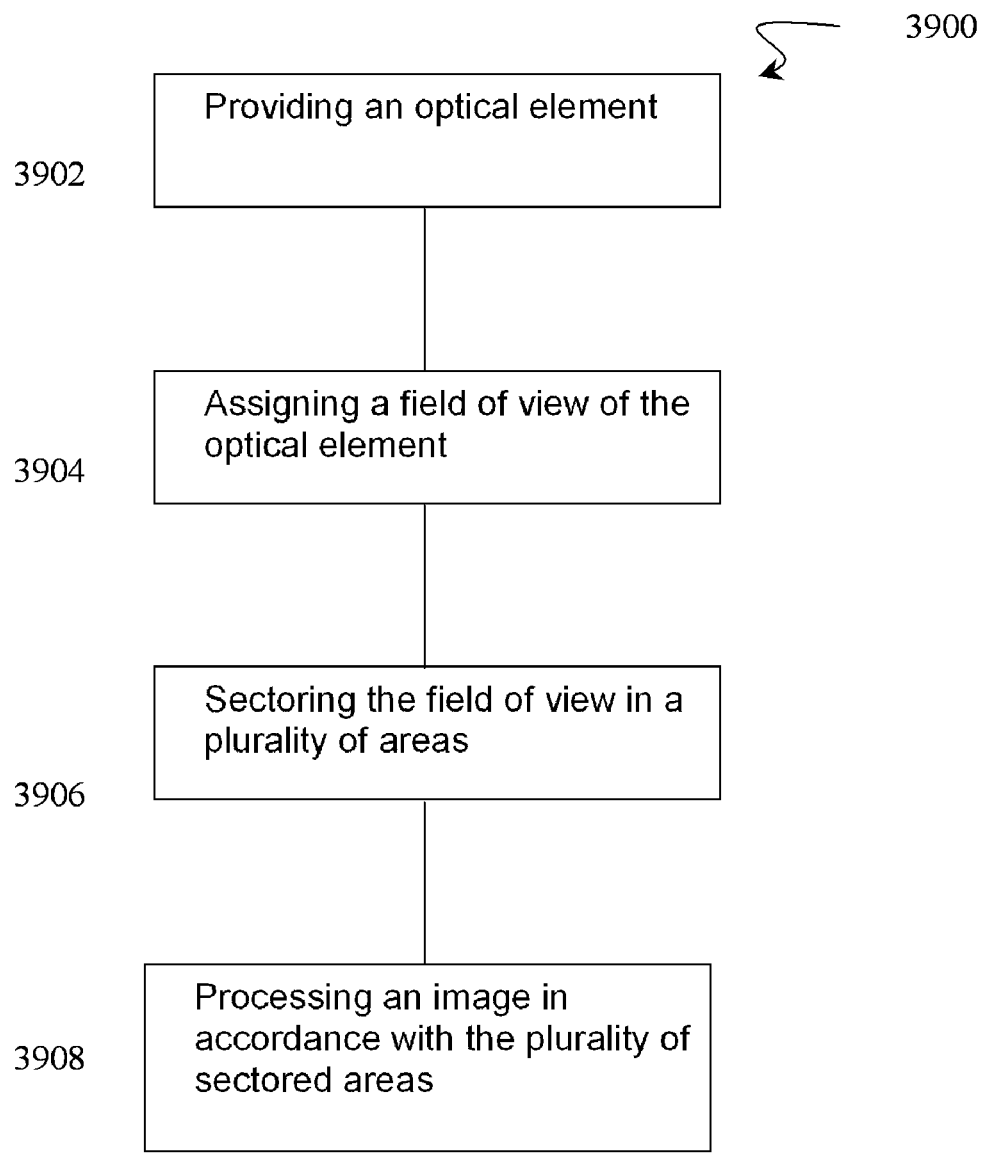
FIG. 39 illustrates a flowchart of a method of the present disclosure.

FIG. 39 illustrates a flowchart of a method 3900 of the present disclosure. The method 3900 of modeling an image may include providing an optical element (block 3902), assigning a field of view of the optical element (block 3904), sectoring the field of view in a plurality of areas (block 3906), and processing an image in accordance with the plurality of sectored areas (block 3908). In the method 3900, the processing the image further may include processing at least one projection selected from: a planar projection, a planar logarithmic projection, a spherical logarithmic projection, a spherical projection, and a log-polar projection. In the method 3900, the processing the image may further include processing at least one coordinate selected from: a Cartesian coordinate, a spherical coordinate, and a logarithmic coordinate.

In the method 3900, the processing the image may further include rendering the image to have a feature selected from the following: rotation-invariant, scale-invariant, and translation-invariant.

In the method 3900, the sectoring the field of view in the plurality of areas may further include sectoring the field of view at least in an area selected from: a foveal area, a para-foveal area, a near-peripheral area, and a peripheral area.

In the method 3900, the providing the optical element may further include providing a lens. The providing the lens may further include providing one of a log-polar lens and a mirror. In the method 3900, the providing the log-polar lens may further include applying a planar projection in a central area of a field of view. The providing the log-polar lens may further include applying a spherical projection in a peripheral area of a field of view.

In the method 3900, the providing the lens may include providing a fish-eye lens, a pin hole camera lens, and a wide-angle foveated lens. Further, the method may further include sensing an object in the field of view, the sensing being performed in accordance with at least one of a plurality of sectors of the field of view. In the method 3900, the processing the image may further include storing the image, detecting an edge in a peripheral area, transforming into a perspective coordinate, detecting a straight line by performing Hough transform, determining a boundary line, locating a gaze direction, and controlling a camera.

The foregoing method 3900 or elements of the method 3900 could also be stored on a computer-readable medium having computer-executable instructions to implement the method 3900 or the elements of the method 3900.

Figure 40:
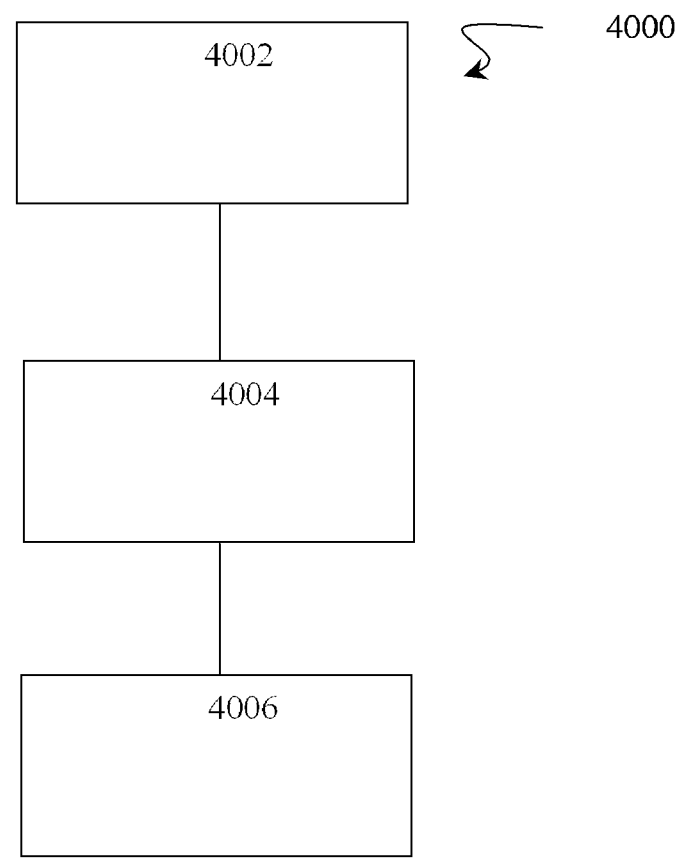
FIG. 40 illustrates a block diagram of an exemplary embodiment of an apparatus of the present disclosure.
Figure 41A:
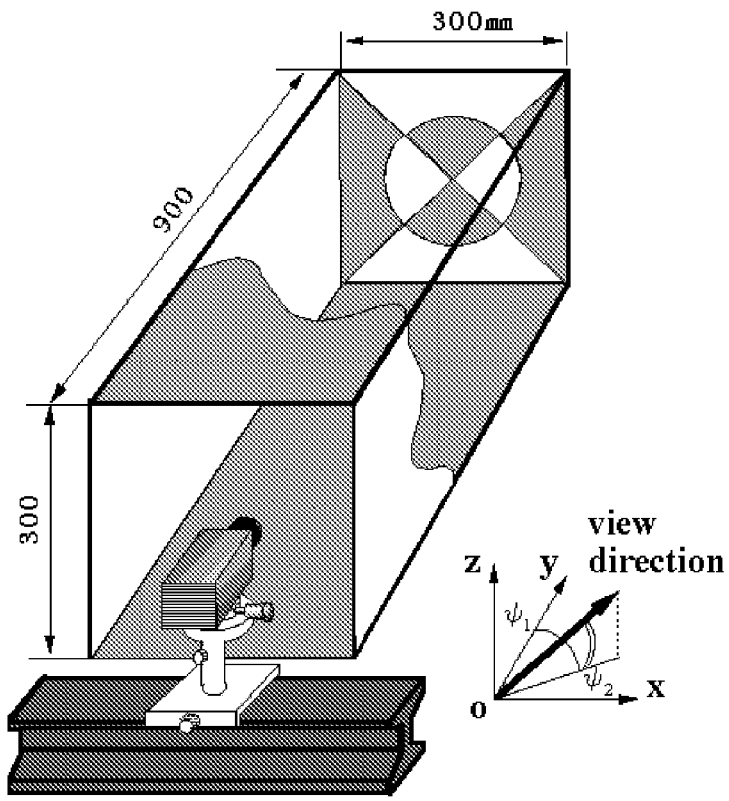
FIG. 41A shows a 3D test pattern.
Figure 41B:
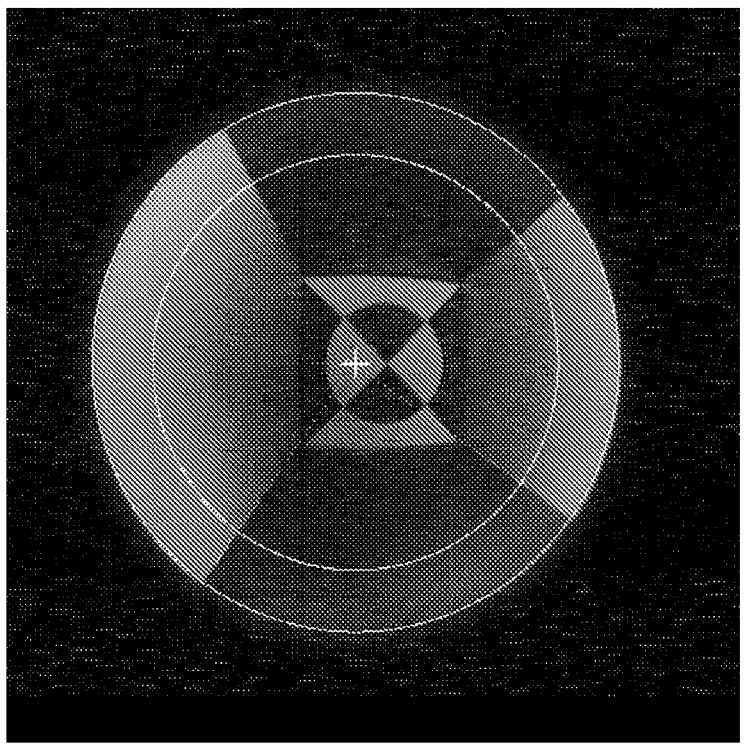
FIG. 41B shows 3D test pattern image by an AdWAF lens.
Figure 42A:
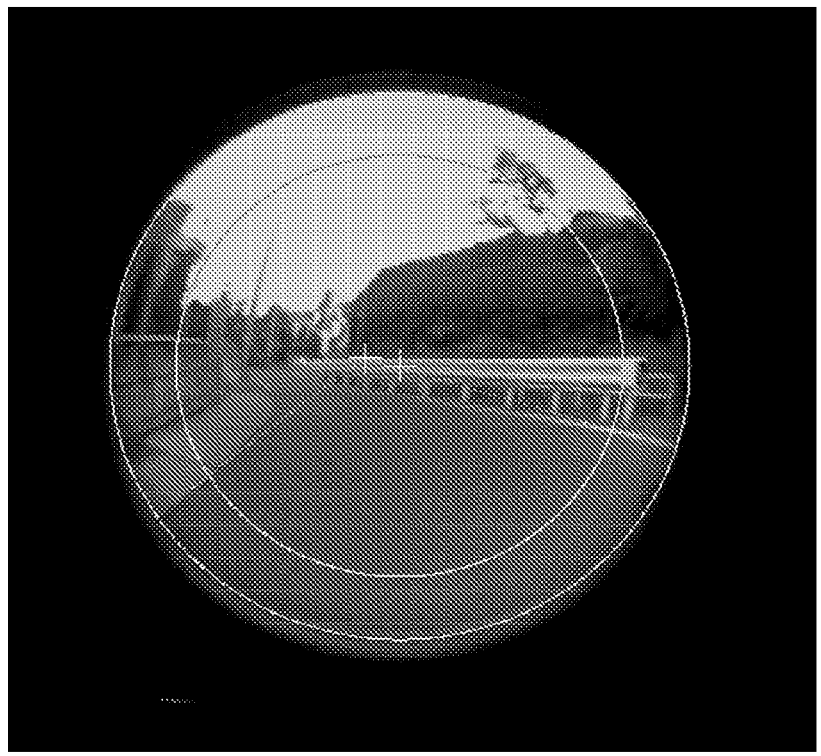
FIGS. 42A and 42B show detecting a vanishing point from two road boundary lines
Figure 42B:
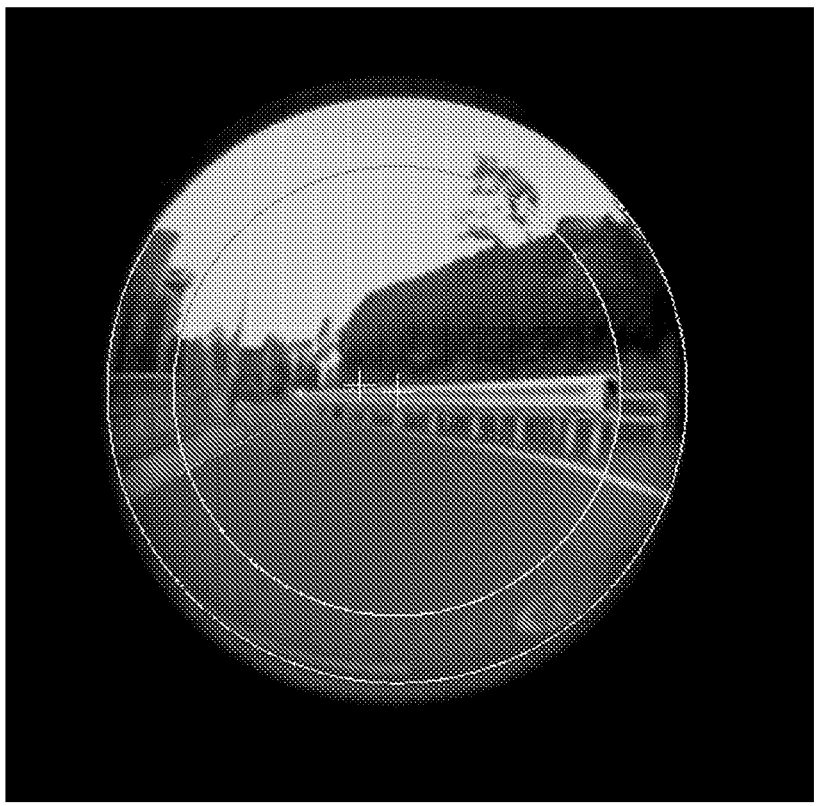
Figure 43:
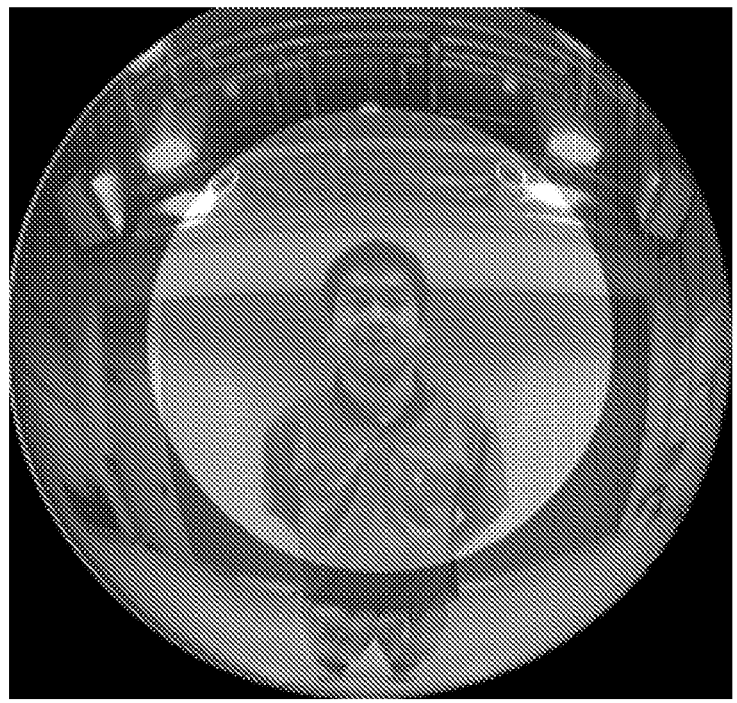
FIG. 43 shows a face detection using color information in the central FOV.
Figure 44:
FIG. 44 shows a moving object detection using gray-scale information in the peripheral FOV as an example of all-purpose use of the AdWAF lens.

FIG. 40 illustrates a block diagram of an exemplary embodiment of an apparatus 4000 of the present disclosure. The apparatus 4000 may include an optical element 4002 having a field of view, an image sectoring element 4004 coupled to the optical element 4002, the image sectoring element 4004 configured to sector the field of view in a plurality of areas, and an image processor 4006 coupled to the image sectoring element 4004, the image processor 4006 configured to process an image in accordance with the plurality of areas.

In the apparatus 4000, the image processor 4006 may be further configured to process at least one projection selected from: a planar projection, a planar logarithmic projection, a spherical logarithmic projection, a spherical projection, and a log-polar projection. The image processor 4006 may be further configured to process at least one coordinate selected from: a Cartesian coordinate, a spherical coordinate, and a logarithmic coordinate.

In the apparatus 4000, the image processor 4006 may also be further configured to render the image to have a feature selected from: a rotation-invariant feature, a scale-invariant feature, and a translation-invariant feature.

The image sectoring element 4004 may be further configured to sector the field of view at least in an area selected from: a foveal area, a para-foveal area, a near-peripheral area, and a peripheral area.

The optical element 4002 may be configured to apply at least one of a planar projection in a central area of the field of view and a spherical projection in a peripheral area of the field of view. The optical element 4002 may include one of a fish-eye lens, a pin hole camera lens, a mirror, and a wide-angle foveated lens.

The apparatus 4000 may further include a sensor coupled to the image processor 4006, the sensor configured to sense at least one of a plurality of sectors of a field of view. In the apparatus 4000, the image processor 4006 may be further configured to store the image, detect an edge in a peripheral area, transform into a perspective coordinate, detect a straight line by performing Hough transform, determine a boundary line, locate a gaze direction, and control a camera.

As used in this specification and appended claims, the singular forms "a," "an," and "the" include plural referents unless the specification clearly indicates otherwise. The term "plurality" includes two or more referents unless the specification clearly indicates otherwise. Further, unless described otherwise, all technical and scientific terms used herein have meanings commonly understood by a person having ordinary skill in the art to which the disclosure pertains.

As a person having ordinary skill in the art would appreciate, the elements or blocks of the methods described above could take place at the same time or in an order different from the described order.

It should be emphasized that the above-described embodiments are merely some possible examples of implementation, set forth for a clear understanding of the principles of the disclosure. Many variations and modifications may be made to the above-described embodiments of the invention without departing substantially from the principles of the invention. All such modifications and variations are intended to be included herein within the scope of this disclosure and the present invention and protected by the following claims.

What is claimed is:

1. A method of modeling an image, the method comprising:
providing an optical element;
assigning a field of view of the optical element;
sectoring the field of view in at least three sectored areas; and
processing the image in accordance with the at least three sectored areas, the processing of the image comprising:
performing a planar projection on a first sectored area of the at least three sectored areas,
performing a planar logarithmic projection on a second sectored area of the at least three sectored areas, and
performing a spherical projection on a third sectored area of the at least three sectored areas.

2. The method of claim 1, wherein the processing of the image further comprises
performing a spherical logarithmic projection on a fourth sectored area of the at least three sectored areas.

3. The method of claim 1, wherein the processing of the image further
comprises performing a log-polar projection, the performing of the log-polar projection comprising converting coordinates of at least one sectored area of the at least three sectored areas to polar coordinates.

4. The method of claim 1, wherein the processing of the image renders each of the at least three sectored areas of the image to have at least one feature selected from the group consisting of:
- rotation-invariant,
- scale-invariant, and
- translation-invariant.

5. The method of claim 1, wherein the at least three sectored areas are selected from the group comprising:
- a foveal area,
- a para-foveal area,
- a near-peripheral area, and
- a peripheral area.

6. The method of claim 1, wherein the providing of the optical element comprises providing a lens.

7. The method of claim 6, wherein the providing of the lens comprises providing one of a log-polar lens and a mirror.

8. The method of claim 7, wherein the providing of the log-polar lens further comprises applying a planar projection in a central area of a field of view.

9. The method of claim 7, wherein the providing of the log-polar lens further comprises applying a spherical projection in a peripheral area of a field of view.

10. The method of claim 6, wherein the providing of the lens comprises providing a lens selected from the group consisting of a fish-eye lens, a pin hole camera lens, and a wide-angle foveated lens.

11. The method of claim 1, wherein the method further comprises sensing an object in the field of view, the sensing being performed in accordance with at least one of the at least three sectored areas of the field of view.

12. The method of claim 1, wherein the processing of the image further comprises:
- storing the image;
- detecting an edge in a peripheral area;
- transforming into a perspective coordinate;
- detecting a straight line by performing Hough transform;
- determining a boundary line;
- locating a gaze direction; and
- controlling a camera.

13. The method according to claim 1, wherein the processing of the image renders the image scale-invariant at least up to a field of view angle of 120°.

14. An apparatus for processing an image, comprising:
- an optical element having a field of view;
- an image sectoring element coupled to the optical element, the image sectoring element configured to sector the field of view in at least three sectored areas; and
- an image processor coupled to the image sectoring element, the image processor configured to process the image in accordance with the at least three sectored areas, the processing of the image comprising:
  - performing a planar projection on a first sectored area of the at least three sectored areas,
  - performing a planar logarithmic projection on a second sectored area of the at least three sectored areas, and
  - performing a spherical projection on a third sectored area of the at least three sectored areas.

15. The apparatus of claim 14, wherein the processing of the image further comprises performing a spherical logarithmic projection on a fourth sectored area of the at least three sectored areas.

16. The apparatus of claim 14, wherein the processing of the image further comprises performing a log-polar projection, the performing of the log-polar projection comprising converting coordinates of at least one sectored area of the at least three sectored areas to polar coordinates.

17. The apparatus of claim 16, wherein the processing of the image renders the image scale-invariant at least up to a field of view angle of 120°.

18. The apparatus of claim 14, wherein the processing of the image renders each of the at least three sectored areas of the image to have at least one feature selected from the group consisting of:
- rotation-invariant,
- scale-invariant, and
- translation-invariant.

19. The apparatus of claim 14, wherein the at least three sectored areas are selected from the group comprising:
- a foveal area,
- a para-foveal area,
- a near-peripheral area, and
- a peripheral area.

20. The apparatus of claim 14, wherein the optical element is configured to apply at least one of:
- a planar projection in a central area of the field of view and
- a spherical projection in a peripheral area of the field of view.

21. The apparatus of claim 14, wherein the optical element comprises one of a fish-eye lens, a pin hole camera lens, a mirror, and a wide-angle foveated lens.

22. The apparatus of claim 14, wherein the apparatus further comprises a sensor coupled to the image processor, the sensor configured to sense at least one of the at least three sectored areas of the field of view.

23. The apparatus of claim 14, wherein the image processor is further configured to:
- store the image;
- detect an edge in a peripheral area;
- transform into a perspective coordinate;
- detect a straight line by performing Hough transform;
- determine a boundary line;
- locate a gaze direction; and
- control a camera.

24. A non-transitory computer-readable medium having computer-executable instructions for:
- providing an optical element;
- assigning a field of view of the optical element;
- sectoring the field of view in at least three sectored areas; and
- processing an image in accordance with the at least three sectored areas, the processing of the image comprising:
  - performing a planar projection on a first sectored area of the at least three sectored areas,
  - performing a planar logarithmic projection on a second sectored area of the at least three sectored areas, and
  - performing a spherical projection on a third sectored area of the at least three sectored areas.

25. A method of modeling an image, the method comprising:
- providing an optical element;
- assigning a field of view of the optical element;
- sectoring the field of view in at least three sectored areas; and
- processing the image in accordance with the at least three sectored areas, the processing of the image comprising processing at least one coordinate selected from the group consisting of:
- a linear coordinate,
- a logarithmic coordinate,
- a planar coordinate, and
- a spherical coordinate;

wherein the processing of the image renders the image scale-invariant at least up to a field of view angle of 120° and wherein the processing of at least one of the at least three sectored areas comprises performing a planar logarithmic projection.

26. An apparatus for processing an image, comprising:
an optical element having a field of view;
an image sectoring element coupled to the optical element, the image sectoring element configured to sector the field of view in at least three sectored areas; and
an image processor coupled to the image sectoring element, the image
processor configured to process the image in accordance with the at least three sectored areas, the processing of the image comprising processing at least one coordinate selected from the group consisting of:
a linear coordinate,
a logarithmic coordinate,
a planar coordinate, and
a spherical coordinate;
wherein the processing of the image renders the image scale-invariant at least up to a field of view angle of 120° and wherein the processing of at least one of the at least three sectored areas comprises performing a planar logarithmic projection.

* * * * *